(12) United States Patent
Ichimura

(10) Patent No.: US 7,761,228 B2
(45) Date of Patent: Jul. 20, 2010

(54) MOBILE OBJECT LOCATION PROVIDING DEVICE AND MOBILE OBJECT LOCATION PROVIDING SYSTEM

(75) Inventor: Atsushi Ichimura, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 0 days.

(21) Appl. No.: 12/314,567

(22) Filed: Dec. 12, 2008

(65) Prior Publication Data

US 2009/0125231 A1 May 14, 2009

Related U.S. Application Data

(62) Division of application No. 10/921,173, filed on Aug. 19, 2004, now Pat. No. 7,480,563.

(30) Foreign Application Priority Data

Aug. 22, 2003 (JP) ............... 2003-298766

(51) Int. Cl.
*G01C 21/10* (2006.01)
*G08G 1/127* (2006.01)
*G08G 1/123* (2006.01)

(52) U.S. Cl. .................... 701/207; 701/200; 455/456.1; 455/456.5; 340/988

(58) Field of Classification Search ................. 701/207, 701/209, 200, 204; 455/456.1, 456.2, 440, 455/441, 456.5; 340/988
See application file for complete search history.

(56) References Cited

U.S. PATENT DOCUMENTS

| 5,023,798 | A | 6/1991 | Neukirchner et al. |
| 5,727,057 | A | 3/1998 | Emery et al. |
| 6,393,294 | B1 | 5/2002 | Perez-Breva et al. |
| 6,738,614 | B1 | 5/2004 | Blankenship et al. |
| 6,857,016 | B1 | 2/2005 | Motoyama et al. |
| 6,957,074 | B2 * | 10/2005 | Wang et al. ............. 455/456.1 |
| 7,003,288 | B2 | 2/2006 | Ueda et al. |
| 7,487,252 | B2 * | 2/2009 | Vossler .................. 709/232 |
| 7,565,155 | B2 * | 7/2009 | Sheha et al. .......... 455/456.1 |
| 2001/0044802 | A1 | 11/2001 | Hirono |
| 2002/0082774 | A1 | 6/2002 | Bloebaum |
| 2003/0040272 | A1 | 2/2003 | Lelievre et al. |
| 2004/0043772 | A1 | 3/2004 | Quirke et al. |
| 2004/0064565 | A1 | 4/2004 | Batra et al. |
| 2004/0096041 | A1 | 5/2004 | Beckmann et al. |
| 2004/0192342 | A1 * | 9/2004 | Ranganathan .......... 455/456.1 |

(Continued)

FOREIGN PATENT DOCUMENTS

JP    A 10-026535    1/1998

(Continued)

*Primary Examiner*—Thomas G Black
*Assistant Examiner*—Christine M Behncke
(74) *Attorney, Agent, or Firm*—Oliff & Berridge, PLC

(57) ABSTRACT

In a mobile object location providing device, time required for distribution of distribution data per kind of the communicating unit is stored, a current location and a movement history of a mobile object is calculated, distribution time that is time required for distributing the distribution for a communicating unit is estimated based on the distribution condition information, and a future location of a mobile object after lapse of the distribution time is estimated based on use of the movement history, and a requests is made for distributing area information of an area surrounding the future location.

9 Claims, 23 Drawing Sheets

U.S. PATENT DOCUMENTS

2004/0203883 A1* 10/2004 Jollis .................. 455/456.1
2006/0148488 A1    7/2006 Syrbe

FOREIGN PATENT DOCUMENTS

| JP | A 10-160491  | 6/1998  |
| JP | A 2002-032375 | 1/2002 |
| JP | A 2002-092785 | 3/2002 |
| JP | A 2002-202135 | 7/2002 |
| JP | A 2002-319098 | 10/2002 |
| JP | A 2003-014472 | 1/2003 |
| JP | A 2003-042782 | 2/2003 |

* cited by examiner

FIG.3

MOVEMENT HISTORY INFORMATION

| MOVEMENT DIRECTION 1 | MOVEMENT SPEED 1 |
|---|---|
| MOVEMENT DIRECTION 2 | MOVEMENT SPEED 2 |
| ⋮ | ⋮ |
| MOVEMENT DIRECTION Q | MOVEMENT SPEED Q |

FIG.4

DISTRIBUTION DATA SIZE INFORMATION

| DATA KIND 1 (FOR EXAMPLE, VECTOR MAP) | NUMBER OF DATA 1 | SIZE 1 |
|---|---|---|
| DATA KIND 2 (FOR EXAMPLE, SURROUNDING DATA) | NUMBER OF DATA 2 | SIZE 2 |
| ⋮ | ⋮ | ⋮ |
| DATA KIND n | NUMBER OF DATA n | SIZE n |

FIG.5A

| DEVICE IDENTIFICATION | SENT DISTRIBUTION RECORD | RECEIVED DISTRIBUTION RECORD |
|---|---|---|
| A | SENT DISTRIBUTION RECORD A | RECEIVED DISTRIBUTION RECORD A |
| B | SENT DISTRIBUTION RECORD B | RECEIVED DISTRIBUTION RECORD B |
| ⋮ | ⋮ | ⋮ |
| ⋮ | ⋮ | ⋮ |
| m | SENT DISTRIBUTION RECORD m | RECEIVED DISTRIBUTION RECORD m |

| FIRST DEFAULT INFORMATION | SENT DISTRIBUTION RECORD AO | RECEIVED DISTRIBUTION RECORD AO |
|---|---|---|

FIG.5B

| ELECTRIC FIELD INTENSITY / MOVEMENT SPEED | ELECTRIC FIELD INTENSITY 1 | ELECTRIC FIELD INTENSITY 2 | ... | ... | ELECTRIC FIELD INTENSITY y |
|---|---|---|---|---|---|
| MOVEMENT SPEED 1 | DISTRIBUTION SPEED 11 | DISTRIBUTION SPEED 12 | ... | ... | DISTRIBUTION SPEED 1y |
| MOVEMENT SPEED 2 | DISTRIBUTION SPEED 21 | DISTRIBUTION SPEED 22 | ... | ... | DISTRIBUTION SPEED 2y |
| ⋮ | ⋮ | ⋮ | ⋮ | ⋮ | ⋮ |
| ⋮ | ⋮ | ⋮ | ⋮ | ⋮ | ⋮ |
| MOVEMENT SPEED x | DISTRIBUTION SPEED x1 | DISTRIBUTION SPEED x2 | ... | ... | DISTRIBUTION SPEED xy |

| SECOND DEFAULT INFORMATION | SENT DISTRIBUTION RECORD BO | RECEIVED DISTRIBUTION RECORD BO |
|---|---|---|

FIG.18

| ELECTRIC FIELD INTENSITY / MOVEMENT SPEED | ELECTRIC FIELD INTENSITY 1 | ELECTRIC FIELD INTENSITY 2 | ... | ELECTRIC FIELD INTENSITY y |
|---|---|---|---|---|
| MOVEMENT SPEED 1 | DISTRIBUTION TIME 11 DATA SIZE 11 | DISTRIBUTION TIME 12 DATA SIZE 12 | ... | DISTRIBUTION TIME 1y DATA SIZE 1y |
| MOVEMENT SPEED 2 | DISTRIBUTION TIME 21 DATA SIZE 21 | DISTRIBUTION TIME 22 DATA SIZE 22 | ... | DISTRIBUTION TIME 2y DATA SIZE 2y |
| ... | ... | ... | ... | ... |
| ... | ... | ... | ... | ... |
| MOVEMENT SPEED x | DISTRIBUTION TIME x1 DATA SIZE x1 | DISTRIBUTION TIME x2 DATA SIZE x2 | ... | DISTRIBUTION TIME xy DATA SIZE xy |

| SECOND DEFAULT INFORMATION | SENT DISTRIBUTION RECORD B0 | SENT DISTRIBUTION RECORD B0 |
|---|---|---|

FIG.19

| DEVICE IDENTIFICATION | SENT DISTRIBUTION RECORD | RECEIVED DISTRIBUTION RECORD |
|---|---|---|
| A, B, C | SENT DISTRIBUTION RECORD 1 | RECEIVED DISTRIBUTION RECORD 1 |
| D, E, F | SENT DISTRIBUTION RECORD 2 | RECEIVED DISTRIBUTION RECORD 2 |
| ⋮ | ⋮ | ⋮ |
| ⋮ | ⋮ | ⋮ |
| X, Y, Z | SENT DISTRIBUTION RECORD m | RECEIVED DISTRIBUTION RECORD m |

| FIRST DEFAULT INFORMATION | SENT DISTRIBUTION RECORD AO | RECEIVED DISTRIBUTION RECORD AO |
|---|---|---|

FIG.20

| DEVICE IDENTIFICA-TION | COMMUNICATION KIND | SENT DISTRIBUTION RECORD | RECEIVED DISTRIBUTION RECORD |
|---|---|---|---|
| A | COMMUNICATION KIND A-1 (LINE SWITCHING) | SENT DISTRIBUTION RECORD A-1 | RECEIVED DISTRIBUTION RECORD A-1 |
| | COMMUNICATION KIND A-2 (PACKET) | SENT DISTRIBUTION RECORD A-2 | RECEIVED DISTRIBUTION RECORD A-2 |
| B | COMMUNICATION KIND B-1 (LINE SWITCHING) | SENT DISTRIBUTION RECORD B-1 | RECEIVED DISTRIBUTION RECORD B-1 |
| C | COMMUNICATION KIND C-1 (LINE SWITCHING) | SENT DISTRIBUTION RECORD C-1 | RECEIVED DISTRIBUTION RECORD C-1 |
| | COMMUNICATION KIND C-2 (PACKET) | SENT DISTRIBUTION RECORD C-2 | RECEIVED DISTRIBUTION RECORD C-2 |
| ⋮ | ⋮ | ⋮ | ⋮ |
| m | COMMUNICATION KIND m-1 | SENT DISTRIBUTION RECORD m-1 | RECEIVED DISTRIBUTION RECORD m-1 |
| | COMMUNICATION KIND m-2 | SENT DISTRIBUTION RECORD m-2 | RECEIVED DISTRIBUTION RECORD m-2 |

| FIRST DEFAULT INFORMATION | SENT DISTRIBUTION RECORD AO | RECEIVED DISTRIBUTION RECORD AO |
|---|---|---|

FIG.21A

| DEVICE IDENTIFICA-TION | CONNECTION DESTINATION | SENT DISTRIBUTION RECORD | RECEIVED DISTRIBUTION RECORD |
|---|---|---|---|
| A | CONNECTION DESTINATION A-1 | SENT DISTRIBUTION RECORD A-1 | RECEIVED DISTRIBUTION RECORD A-1 |
| | CONNECTION DESTINATION A-2 | SENT DISTRIBUTION RECORD A-2 | RECEIVED DISTRIBUTION RECORD A-2 |
| | CONNECTION DESTINATION A-3 | SENT DISTRIBUTION RECORD A-3 | RECEIVED DISTRIBUTION RECORD A-3 |
| | ⋮ | ⋮ | ⋮ |
| B | CONNECTION DESTINATION B-1 | SENT DISTRIBUTION RECORD B-1 | RECEIVED DISTRIBUTION RECORD B-1 |
| | CONNECTION DESTINATION B-2 | SENT DISTRIBUTION RECORD B-2 | RECEIVED DISTRIBUTION RECORD B-2 |
| ⋮ | ⋮ | ⋮ | ⋮ |
| ⋮ | ⋮ | ⋮ | ⋮ |
| m | CONNECTION DESTINATION m-1 | SENT DISTRIBUTION RECORD m-1 | RECEIVED DISTRIBUTION RECORD m-1 |
| | CONNECTION DESTINATION m-2 | SENT DISTRIBUTION RECORD m-2 | RECEIVED DISTRIBUTION RECORD m-2 |
| | CONNECTION DESTINATION m-3 | SENT DISTRIBUTION RECORD m-3 | RECEIVED DISTRIBUTION RECORD m-3 |
| | FIRST DEFAULT INFORMATION | SENT DISTRIBUTION RECORD AO | RECEIVED DISTRIBUTION RECORD AO |

FIG.21B

| DEVICE IDENTIFICA-TION | COMMUNICATION TIME | SENT DISTRIBUTION RECORD | RECEIVED DISTRIBUTION RECORD |
|---|---|---|---|
| A | COMMUNICATION TIME A-1 | SENT DISTRIBUTION RECORD A-1 | RECEIVED DISTRIBUTION RECORD A-1 |
| | COMMUNICATION TIME A-2 | SENT DISTRIBUTION RECORD A-2 | RECEIVED DISTRIBUTION RECORD A-2 |
| | COMMUNICATION TIME A-3 | SENT DISTRIBUTION RECORD A-3 | RECEIVED DISTRIBUTION RECORD A-3 |
| | ⋮ | ⋮ | ⋮ |
| B | COMMUNICATION TIME B-1 | SENT DISTRIBUTION RECORD B-1 | RECEIVED DISTRIBUTION RECORD B-1 |
| | COMMUNICATION TIME B-2 | SENT DISTRIBUTION RECORD B-2 | RECEIVED DISTRIBUTION RECORD B-2 |
| ⋮ | ⋮ | ⋮ | ⋮ |
| ⋮ | ⋮ | ⋮ | ⋮ |
| m | COMMUNICATION TIME m-1 | SENT DISTRIBUTION RECORD m-1 | RECEIVED DISTRIBUTION RECORD m-1 |
| | COMMUNICATION TIME m-2 | SENT DISTRIBUTION RECORD m-2 | RECEIVED DISTRIBUTION RECORD m-2 |
| | COMMUNICATION TIME m-3 | SENT DISTRIBUTION RECORD m-3 | RECEIVED DISTRIBUTION RECORD m-3 |
| | FIRST DEFAULT INFORMATION | SENT DISTRIBUTION RECORD AO | RECEIVED DISTRIBUTION RECORD AO |

FIG.22

| DEVICE IDENTIFICATION | SENT DISTRIBUTION RECORD BEFORE CONNECTION | RECEIVED DISTRIBUTION RECORD BEFORE CONNECTION | SENT DISTRIBUTION RECORD DURING CONNECTION | RECEIVED DISTRIBUTION RECORD DURING CONNECTION |
|---|---|---|---|---|
| A | SENT DISTRIBUTION RECORD BEFORE CONNECTION A | RECEIVED DISTRIBUTION RECORD BEFORE CONNECTION A | SENT DISTRIBUTION RECORD DURING CONNECTION A | RECEIVED DISTRIBUTION RECORD DURING CONNECTION A |
| B | SENT DISTRIBUTION RECORD BEFORE CONNECTION B | RECEIVED DISTRIBUTION RECORD BEFORE CONNECTION B | SENT DISTRIBUTION RECORD DURING CONNECTION B | RECEIVED DISTRIBUTION RECORD DURING CONNECTION B |
| ... | ... | ... | ... | ... |
| ... | ... | ... | ... | ... |
| m | SENT DISTRIBUTION RECORD BEFORE CONNECTION m | RECEIVED DISTRIBUTION RECORD BEFORE CONNECTION m | SENT DISTRIBUTION RECORD DURING CONNECTION m | RECEIVED DISTRIBUTION RECORD DURING CONNECTION m |

| FIRST DEFAULT INFORMATION | SENT DISTRIBUTION RECORD A0 | RECEIVED DISTRIBUTION RECORD A0 |
|---|---|---|

MOBILE OBJECT LOCATION PROVIDING DEVICE AND MOBILE OBJECT LOCATION PROVIDING SYSTEM

This is a Divisional of application Ser. No. 10/921,173 filed Aug. 19, 2004. The disclosure of the prior application is hereby incorporated by reference herein in its entirety.

BACKGROUND OF THE INVENTION

1) Field of the Invention

The present invention relates to a mobile object location providing device and a mobile object location providing system that provide a mobile object such as a vehicle having a routing assistance device with information including map data and surrounding information and the likes around the location where the mobile object exists.

2) Description of the Related Art

Some vehicle navigation systems make it is possible to search information about eating places (restaurants, hotels) around a location of the vehicle. Precisely, a driver inputs a request to obtain the information about eating places, that request is sent to an information center, and the information center sends back information about eating places around the location of the vehicle to the vehicle. The information received is displayed on a display of the navigation system.

However, there is a time lag between when the request is sent to the information centre and when the information is received. The vehicle may have moved to a different location during that time so that it may not be convenient to go to the eating places whose information has been received.

Japanese Patent Application Laid-Open Publication No. 2002-202135 discloses a technique to solve this problem. The idea is to send to the vehicle map information of a location at which the vehicle would be after a specific period of time, i.e., at after the time lag. The position is calculated using speed and present location of the vehicle. GPS (Global Position Satellite) location data and time data are used to calculate the positions of the vehicle.

Some of the vehicle navigation systems have an inbuilt communication function. In some others, a cellular phone is used for the communications. The cellular phone is connected to the vehicle navigation system. At present, the communication speeds of cellular phones commercially available vary with radio communication providers and radio communication systems even in a single provider. For example, the communication speed by PDC (Personal Digital Cellular) method is 9.6 kbps at minimum, while the communication speed by W-CDMA (Wideband Code Division Multiple Access) method is about 144 kbps when the speed of movement is high. Further, even in a same communication method, the communication speeds vary with service environments (antenna positions, differences of electric field intensity owing to movement speeds) of mobile communication terminals such as cellular phones. For example, the communication speed of the W-CDMA method mentioned above is 144 kbps at high speed movement, while that at slow speed movement such as walking appears 384 kbps. Further, the time required for connection preprocesses such as dial-up process and so forth varies with connection destinations.

However, in the conventional technology disclosed in Japanese Patent Application Laid-Open Publication No. 2002-202135, when to obtain the estimated position of a vehicle, only the speed per hour of the vehicle is taken into consideration. In other words, the communication speed of radio communications is not taken into consideration so that appropriate information cannot be obtained.

SUMMARY OF THE INVENTION

It is an object of the present invention to solve at least the problems in the conventional technology.

A mobile object location providing device according to an aspect of the present invention is installed in a mobile object. The mobile object location providing device includes a distribution condition information storage unit that stores distribution condition information that includes information about time required for distribution of distribution data; a current location movement history calculating unit that calculates a current location and a movement history of the mobile object; a distribution time estimating unit that, upon receiving an area information acquisition request estimates distribution time of distribution data based on the distribution condition information; and a future location estimating unit that estimates a future location of the mobile object after lapse of the distribution time from the current location based on the movement history, and outputs a request for distributing area information that is information about an area surrounding the future location.

A mobile object location providing device according to another aspect of the present invention includes a distribution data database that stores area information of a predetermined area; an area information acquiring unit that, upon receiving an area information request from an information provides having a communicating unit, searches for area information of an area surrounding a location of the information providee in the distribution data database and thereby acquires area information, and sends the acquired area information as distribution data to the information provide; a mobile object information storage unit that stores distribution condition information that includes information about time required for distribution of distribution data; a distribution time estimating unit that, upon receiving an area information acquisition request from the information providee, estimates distribution time that is time for distributing the distribution data to the information providee based on input distribution condition information; and a movement amount estimating unit that estimates a future location of the information providee after lapse of the distribution time based on input current location and input movement history of the information providee, wherein the area information acquiring unit acquires area information based on the estimated future location.

A mobile object location providing system according to still another aspect of the present invention includes a mobile object having a communicating unit; and an information center that, upon receiving an area information acquisition request from the mobile object, identifies a location of the mobile object, and acquires area information of an area surrounding the location of the mobile object from a distribution data database that stores area information of a predetermined area, and transmits the area information acquired as distribution data to the mobile object. The mobile object includes a current location movement history calculating unit that calculates a current location and a movement history of the mobile object; and a communication controlling unit that sends the current location and the movement history to the information center. The information center includes a mobile object information storage unit that stores distribution condition information includes information about time required for distribution of distribution data to the mobile object; a distribution time estimating unit that, upon receiving an area information acquisition request from the mobile object, extracts the distribution condition information corresponding to the mobile object from the mobile object information storage unit, and estimates distribution time that is time for distributing the distribution data to the mobile object based on the distribution condition information extracted; a movement amount estimating unit that estimates a future location of the mobile object after lapse of the distribution time from the current location of the mobile object based on the movement history; and an area information acquiring unit that acquires area information of the area surrounding the future location from the distribution data database.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 3 is an example of movement history information stored in a movement history storage unit shown in FIG. 2;

FIG. 4 is an example of distribution data size information stored in a communication controlling unit shown in FIG. 2;

FIG. 5A is an example of contents stored in a distribution condition information storage unit shown in FIG. 2;

FIG. 5B is an example of contents of sent distribution record or received distribution record in the distribution condition information storage unit;

FIGS. 18, 19, 20, 21A, 21B, and 22 are example of contents stored in the distribution condition information storage unit shown in FIG. 2;

DETAILED DESCRIPTION

Exemplary embodiments of a mobile object location providing device and a mobile object location providing system according to the present invention are explained in detail below with reference to accompanying drawings.

Figure 1:
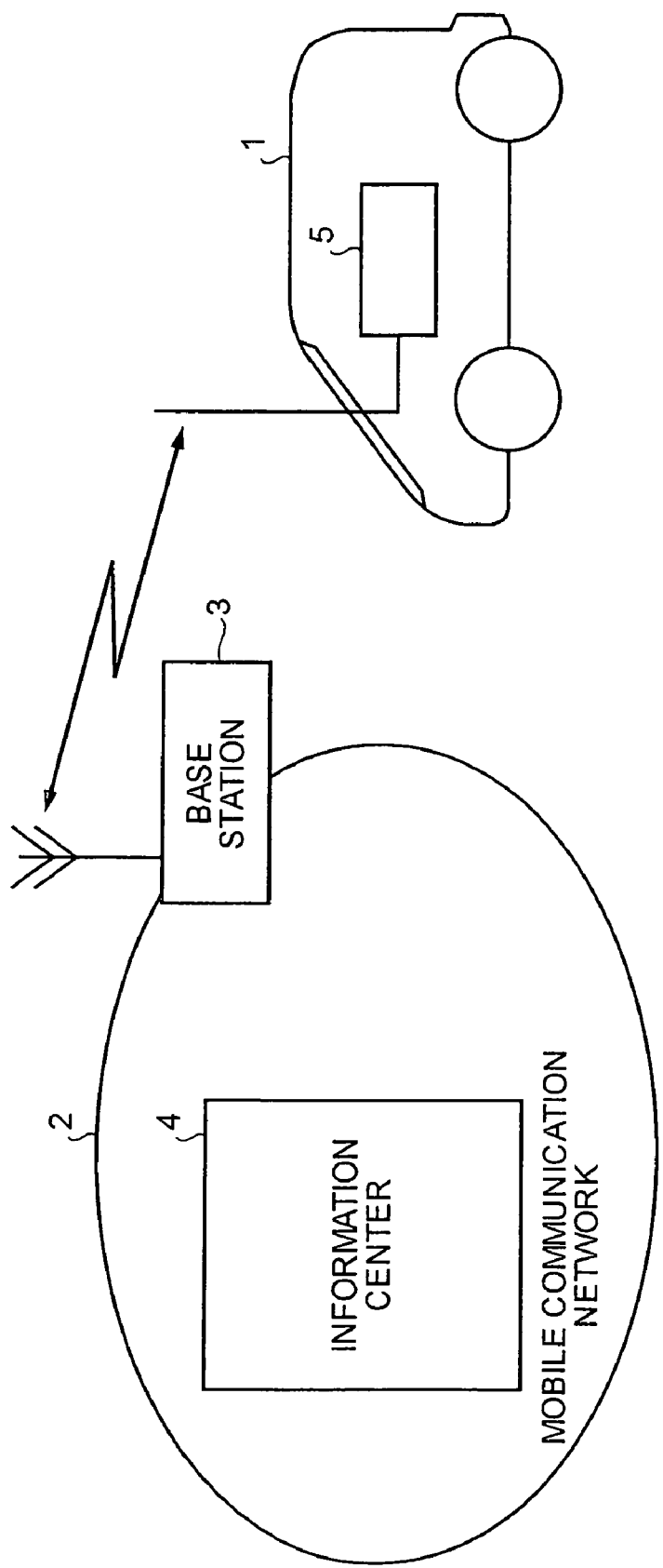
FIG. 1 is a schematic of a system in which a mobile object location providing device according to the present invention is used.

FIG. 1 is a schematic of a system in which a mobile object location providing device according to the present invention is used. This system includes a mobile object 1 such as a vehicle having a communication device 5 for receiving desired information, and a mobile communication network 2 including a base station 3 that carries out radio communications with the mobile object 1 and an information center 4 as an information distribution source to the mobile object 1. In such a system, a mobile object location providing device according to the present invention may be applied to at least 2 cases, i.e., (1) one case to be arranged as the communication device 5 of the mobile object 1, and (2) the other case to be arranged at the information center 4. In the present specification, in a first embodiment, the case where a mobile object location providing device is arranged to the communication device 5 of the mobile object 1 is explained, while in a second embodiment, the case where a mobile object location providing device is arranged at the information center 4 is explained hereinafter.

Figure 2:
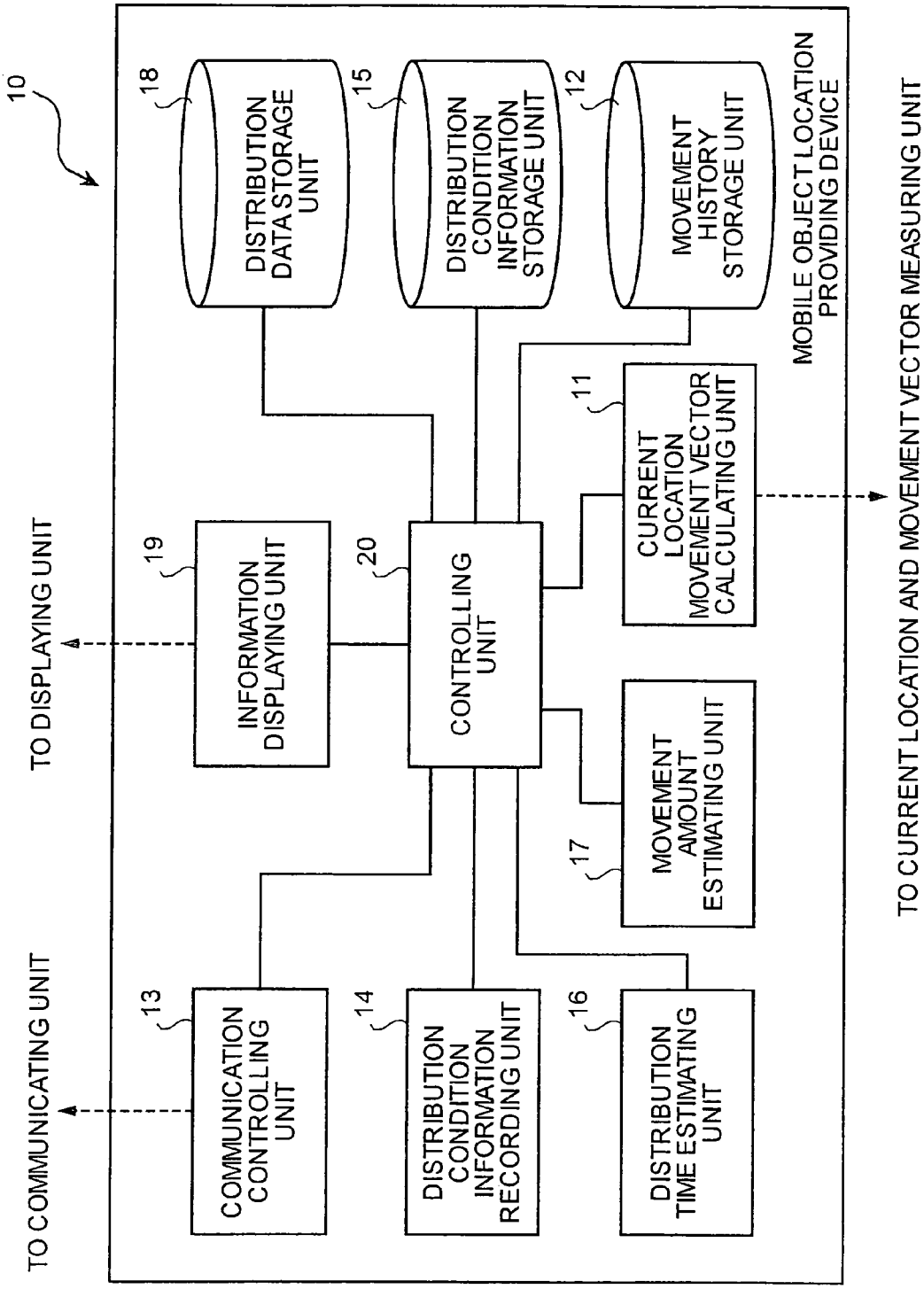
FIG. 2 is a functional block diagram a mobile object location providing device according to an embodiment of the present invention.

FIG. 2 is a block diagram of a rough structure of a mobile object location providing device according to the present invention. A mobile object location providing device 10 is arranged as the communication device 5 to the mobile object 1 such as for example a vehicle or connected to the communication device 5, and includes a current location movement vector calculating unit 11, a movement history storage unit 12, a communication controlling unit 13, a distribution condition information recording unit 14, a distribution condition information storage unit 16, a distribution time estimating unit 16, a movement amount estimating unit 17, a distribution data storage unit 18, an information displaying unit 19, and a controlling unit 20 that controls these components.

The current location movement vector calculating unit 11 is connected to a location and movement vector measuring unit not illustrated therein that measures the location and movement vector (movement speed and movement direction) of the mobile object 1, and calculates the current location and movement vector (movement speed and movement direction) of the mobile object 1 from signals from the location and movement vector measuring unit, at a specified cycle. The calculated current location and movement vector are stored to the movement history storage unit 12 so that time information should be recognized therein. The calculated current position is output to the information displaying unit 19, while the calculated movement speed is output to the distribution condition information recording unit 14. The calculations of the current location and the movement vector may be made by receiving the latitude and longitude and movement vector (movement speed and movement direction) of the current location measured by use of for example a GPS (Global Positioning System) satellite. In general, GPS outputs measured data once per second, therefore, the movement vector in this case becomes a movement distance and an advancing direction per second. After setting the location of the mobile object 1 same as the location on a map by use of a GPS, with a distance sensor such as a car speed sensor and the like, and an azimuth sensor such as a geomagnetic sensor, a vibrating gyro, an optical fiber gyro, a gas rate sensor or the like, the current location and the movement vector may be obtained. In this case, a GPS is employed to correct a displacement between the location at the moment and the location on a map at a specified cycle. Further, as another method to obtain the movement speed and the movement direction, by use of past route information in a specified time of a navigation function to provide route information for a mobile object to reach the objective place thereof, the movement speed and the movement direction may be obtained. The current location movement history calculating unit in the scope of the claims corresponds to this current location movement vector calculating unit 11.

The movement history storage unit 12 stores movement history information as a history of movement vectors in a specified past time calculated by the current location movement vector calculating unit 11. FIG. 3 is a figure of an example of the structure of the movement history storage unit. As shown in FIG. 3, into the movement history storage unit 12, a combination of a movement direction and a movement speed is stored at a specified time interval, for example, at every one second.

The communication controlling unit 13 has functions to control a communicating unit not illustrated therein that carries out communications with the mobile communication network 2, and to ask the information center 4 for distribution data including area information and map information and the likes concerning a designated location (future location) from the information displaying unit 19, and to receive distribution data. When the communicating unit includes a portable communication device such as a cellular phone or the like, the communication controlling unit has also a function to identify the kind of the communication device and keeps the type as device information. Further, the communication controlling unit has a function to monitor communication conditions such as electric field intensity of the communicating unit during communications, the size of sent data and time required for sending, the size and kind of received distribution data, and distribution time required for distribution. These information items are output to the distribution condition information recording unit 14. Meanwhile, among these information items, the size and kind of distribution data are kept as distribution data size information in the communication controlling unit 13. FIG. 4 is a figure of an example of distribution data size information kept by the communication controlling unit. Into this distribution data size information, per kind of received distribution data, for example, per kind of vector map, peripheral data, image map, compressed map image data and the like, the number of data and data size accumulated and added for the number of date are stored.

The distribution condition information recording unit 14 has a function to classify the distribution condition information concerning distribution of distribution data in correspondence to the communication condition obtained from the current location movement vector calculating unit 11 and the communication controlling unit 13, into the device information that the communication controlling unit 13 has, and to store the results into the distribution condition information storage unit 15. In this explanation, the case where the communication condition that can be obtained from the current location movement vector calculating unit 11 is a movement speed, and the communication condition that can be obtained from the communication controlling unit 13 is an electric field intensity of the communicating unit, and the distribution condition information is a distribution speed is described.

The distribution condition information storage unit 15 stores the distribution condition information classified by the distribution condition information recording unit 14. FIG. 5A and FIG. 5B are figures of an example of the structure of the distribution condition information storage unit, and FIG. 5A is a figure of an example of the entire structure of the distribution condition information storage unit, while FIG. 5B is a figure of an example of contents of sent distribution record or received distribution record in the distribution condition information storage unit. The sent distribution record means the record of distribution condition information at sending, while received distribution record means the record of distribution condition information at receiving.

As shown in FIG. 5A, the distribution condition information storage unit 15 is structured by items including "device identification" to which a device type showing a kind of a communication device and the like are input, "sent distribution condition record" to which distribution condition information at sending is stored, and "received distribution condition record" to which distribution condition information at receiving is stored. In addition, a "first default information" column to which the sent distribution record and the received distribution record to be used when a communication device to be used cannot be specified are stored is arranged. This default value to be stored into this first default information is arbitrary, and distribution condition information concerning, for example, the device type of the most sold communication device is set therein.

With regard to the sent distribution record and the received distribution record, as shown in FIG. 5B, distribution condition information is stored into a table of a matrix shape. Herein, movement speed is classified into x steps (x being a natural number), while electric field intensity is classified into y steps (y being a natural number), and distribution speeds per combination of these movement speed and electric field intensity are stored. Steps of movement speed and electric field intensity and ranges showing respective steps may be determined arbitrarily. In each distribution record column, a "second default information" column to which default values of the sent distribution record and the received distribution record corresponding to the device type of a communication device to be used are stored is arranged. These default values are used when the number of data of the distribution condition information concerning the communication device identified by the device identification selected in FIG. 5A is a specified number or below, namely, when data is not recorded completely or sufficiently. For example, in a communication device adopting PDC method, when the communication speed at sending is 9.6 kbps, while the communication speed at receiving is 28.8 kbps, as the default value of the sent distribution record B0, 9.6 kbps is input, while as the default value of the received distribution record B0, 28.8 kbps is input. Meanwhile, these numeric values are values on standards, therefore, general and actual values may be stored instead. The use of these default values enables to obtain a distribution speed even when the distribution condition record is not recorded sufficiently. By the way, the number of data of the distribution condition information may be stored into the second default information column. The distribution condition information storage unit 15 structured as above corresponds to the distribution condition information storage unit.

The distribution time estimating unit 16 has a function to limit the distribution condition information corresponding to the communication device now in use based on the device type of the communication device in the device information that the communication controlling unit 13 keeps, and by use of an average movement speed output from the movement amount estimating unit 17 to be described later herein, and an electric field intensity output from the communication controlling unit 13, extract a distribution speed from the distribution condition information of the distribution condition information storage unit 15, and further, estimate the distribution time from this distribution speed and the data size of the distribution data. The estimated distribution time is output to the movement amount estimating unit 17. This distribution time estimating unit 16 corresponds to the distribution time estimating unit.

The movement amount estimating unit 17 has a function to obtain an average value of movement speed in a specified period at acquisition of the movement amount, and extract the movement history information for distribution time from the distribution time estimating unit 16 obtained to this average movement speed from the movement history storage unit 12, and obtain a future location based on this movement history information. However, when the movement history information to be extracted is a movement vector, in the movement amount estimating unit 17, the extracted movement vector is accumulated and added to the current location, and a future location is obtained, but when the movement history information to be extracted is a movement speed, in the movement amount estimating unit 17, the total of movement amounts is obtained, and the result is only output to the information displaying unit 19. Meanwhile, when the movement vector (movement speed) is not calculated and stored every one second, the movement amount in the specified cycle may be obtained by multiplying the movement speed by the specified cycle with which the movement history is calculated.

The distribution data storage unit 18 stores distribution data including map data around future location including future location received from the information center 4 and area information incidental to map data.

The information displaying unit 19 has a function to issue a distribution request to the information center 4 via the communication controlling unit 13 so that area information that a user wants of a surrounding area with the future location estimated by the movement amount estimating unit 17 as a standard, and draw the current location output from the current location movement vector calculating unit 11 over the map data obtained from the distribution data storage unit 18, and display the current location on a displaying unit not illustrated therein. Herein, the case where the current location is to be displayed on the displaying unit not illustrated is explained, while the drawn information may be displayed to a user by a voice or the like. When the total of movement amounts is received from the movement amount estimating unit 17, the movement amount is added to the current location along a map and the future location is obtained in the information displaying unit 19, and a distribution request is issued to the information center 4 so that area information that a user wants of a surrounding area with the future location as a standard. The future location estimating unit in the claims corresponds to the movement amount estimating unit 1T and the information displaying unit 19.

Figure 6:
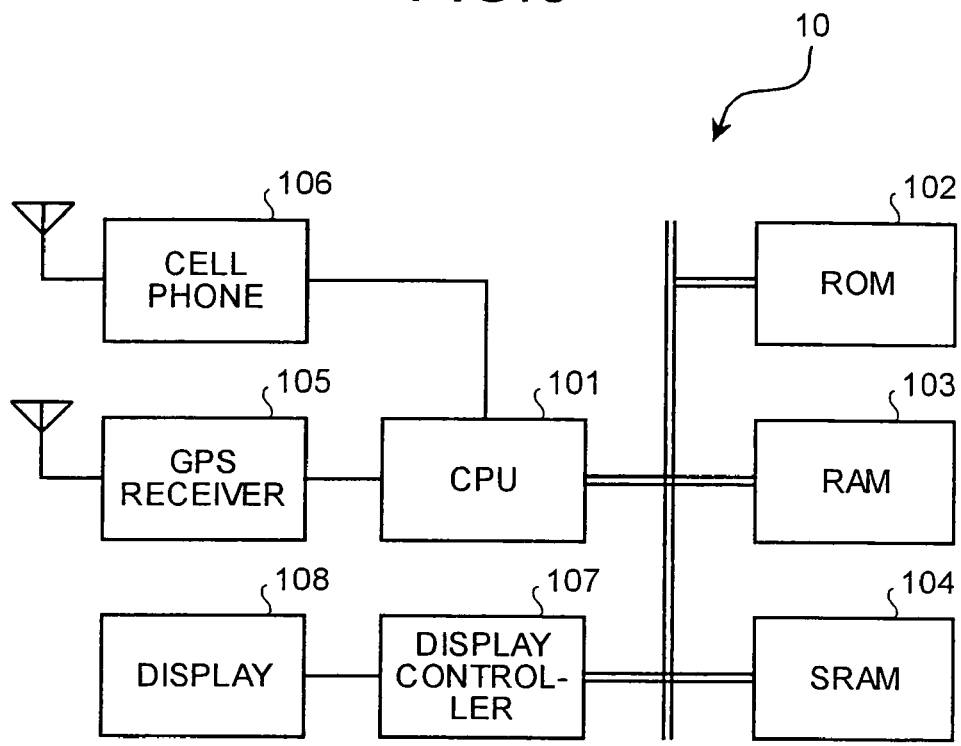
FIG. 6 is a structural block diagram of a hardware configuration of a mobile object location providing device shown in FIG. 2.

The mobile object location providing device 10 having these functions may be embodied by for example a hardware configuration shown in FIG. 6. In concrete, the mobile object location providing device 10 includes a CPU (Central Processing Unit) 101 that carries out the entire control over the mobile object location providing device 10, a ROM (Read Only Memory) 102 that stores software (program) to be executed by the CPU 101 and data, a RAM (Random Access Memory) 103 that is the work area of the software (program) to be executed by the CPU 101, and keeps distribution data such as map data and so forth, a SRAM (Static RAM) 104 that records distribution condition information and distribution data size, a GPS receiver 105 that transfers the result measured by use of a GPS satellite to the CPU 101, a cellular phone 108 that sends location information of the estimated future location to the information center 4, and becomes a radio interface when acquiring map data and area information and the like based on this location information from the information center 4, a display controller 107 that displays the result where a mark representing the current location and the like are drawn over the map data on the RAM 103 by the CPU 101 on a display, and a display 10B that visually displays the drawn result.

The configuration shown in FIG. 6 is one example, and for example, a drawing controller may be further arranged, thereby the process to draw a mark representing the current location and the like over the map data on the RAM 103 may be carried out not by the CPU 101 but by the drawing controller. Further, in the case of necessity to back up map data and the like in preparation against a power failure, map data and the like may be kept not by the RAM 103 but by the SRAM 104.

Figure 7:
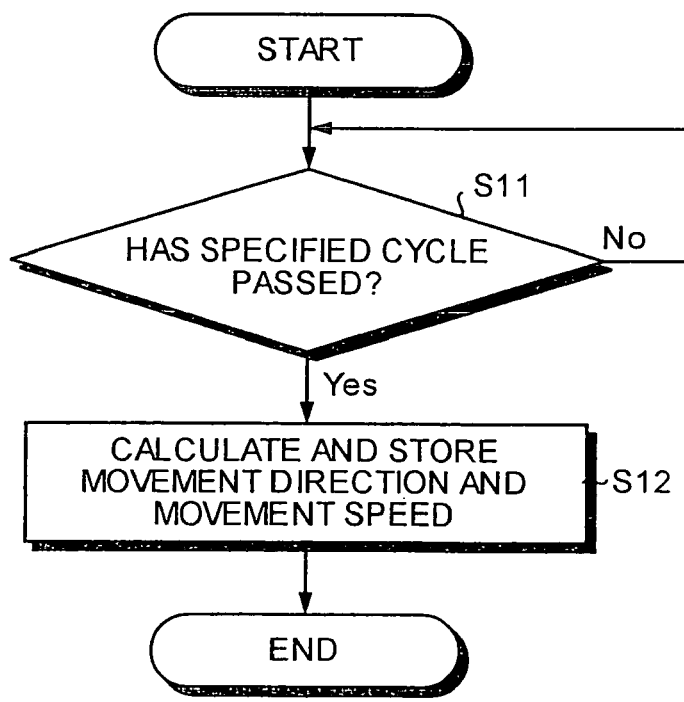
FIG. 7 is a flow chart of a process procedure for acquiring the movement history information.

Hereinafter, actions of the mobile object location providing device 10 according to the present invention are explained. First, the acquisition of the movement history information is explained. FIG. 7 is a flow chart of the action principle to acquire the movement history information. The current location movement vector calculating unit 11 check whether a specified cycle, for example, one second has passed (step S11), and if the specified cycle has not passed (step S11: No), it gets in a standby status until the specified cycle comes along. Thereafter, when the specified cycle has passed (step S11: Yes), it calculates the movement direction and the movement speed by use of measurement signals from the location and movement vector measuring unit and stores them into the movement history storage unit 12 (step S12), and complete the process.

Figure 8:
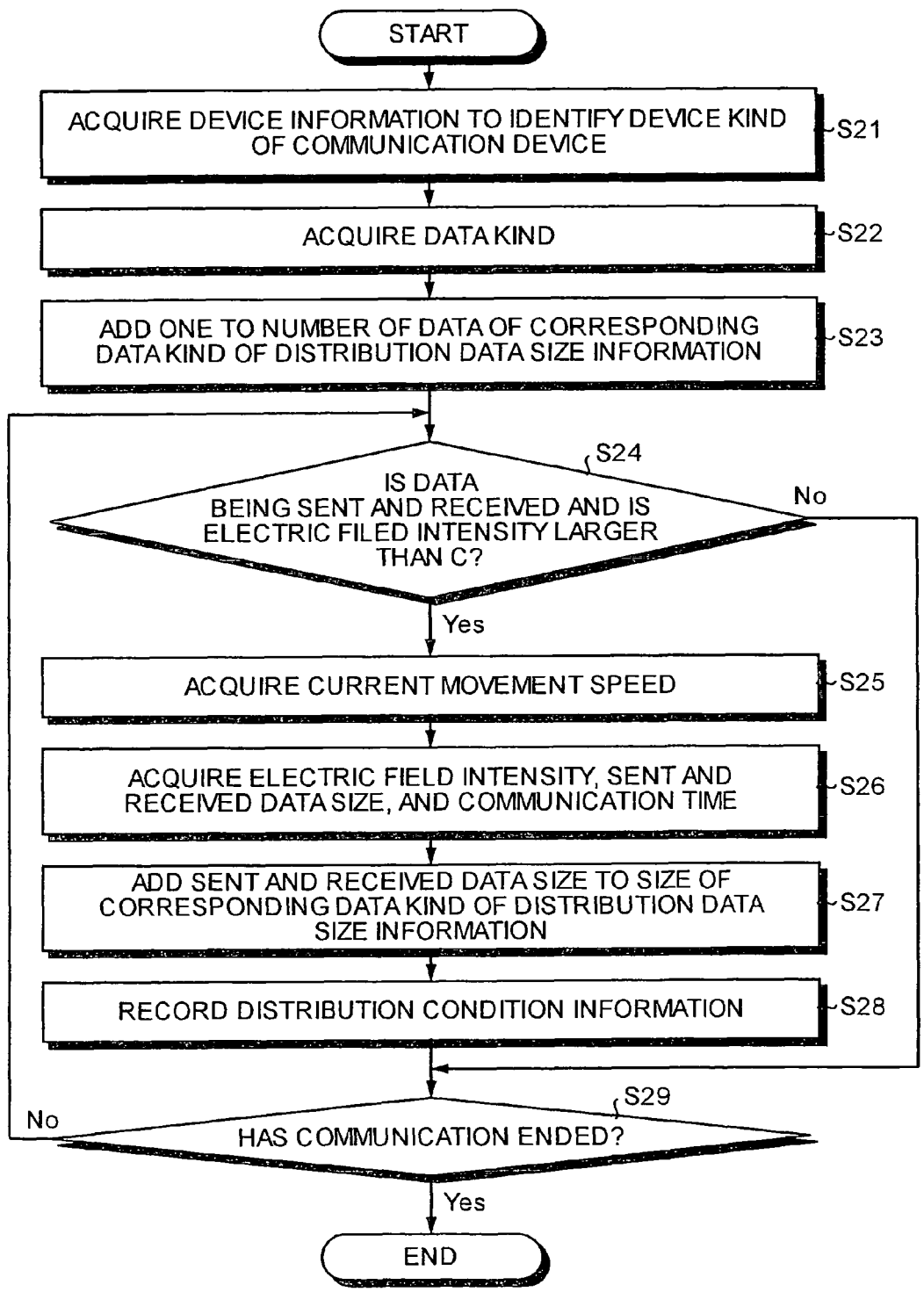
FIG. 8 is a flow chart of a process procedure for recording the distribution condition information.

Next, the recording process of the distribution condition information is explained. FIG. 8 is a flow chart of the record processing procedures of the distribution condition information. First, the communication controlling unit 13 of the mobile object location providing device 10 acquires the device information to identify the kind of the communication device attached as the communicating unit (step S21), and keeps the device information. In addition, the communication controlling unit 13 acquires the data kind with which sending and receiving are carried out (step S22). At this moment, the communication controlling unit 13 carries out a process to add one to the number of data of the corresponding data kind of the distribution data size information that it keeps by itself (step S23).

Then, the communication controlling unit 13 judges whether data is being sent and received and whether the electric filed intensity of the communication device is larger than a specified value C (C being an arbitrary numeric value) (step S24). If data is being sent and received and the electric filed intensity of the communication device is larger than the specified value C (step S24: Yes), it acquires the current movement speed from the current location movement vector calculating unit 11 (step S25). Thereafter, it acquires the sent and received data size, the electric field intensity during sending and receiving, and the distribution time required for sending and receiving data (step S26). At this moment, with regard to the acquired data size, a process to add it to the size of the corresponding data kind of the distribution data size information is carried out by the communication controlling unit 13 (step S27). Next, the acquired data size, electric field intensity and distribution time are output to the distribution condition information recording unit 14, and stored as the distribution condition information into the distribution condition information storage unit 15 by the distribution condition information recording unit 14 (step S28).

Herein, the distribution condition information recording unit 14 stores the distribution condition information to the position corresponding to the combination of the movement speed acquired in the step S25 and the electric field intensity acquired in the step S26, in the distribution record column corresponding to the device kind specified in the step S21 of the distribution condition information storage unit 15 as shown in FIG. 5. The distribution condition information stored at this moment is the distribution speed, and the distribution speed is obtained by dividing the sent and received date size by the distribution time. When the second distribution speed and after are recorded to the area where the combination of the movement speed and the electric field intensity is same, the average speed of the already input previous distribution speed and the distribution speed to be input from now is recorded.

Thereafter, it is judged whether the communication has ended (step S29), and if the communication has not ended yet (step S29: No), then the procedure goes back to the step S24, where the process mentioned above is carried out. If the communication has ended (step S29: Yes), the recording process of the distribution condition information is completed.

Meanwhile, in the step 24, if data is not being sent or received or the measured electric field intensity of the communication device is the specified value or below (step S24: No), then the procedure goes back to the step S29, where the process mentioned above is carried out.

After the step S27, whether to record the distribution condition information may be confirmed to a user, and only when there is a permission to record the distribution condition information from the user, the process of the step S28 and after may be performed.

Figure 9:
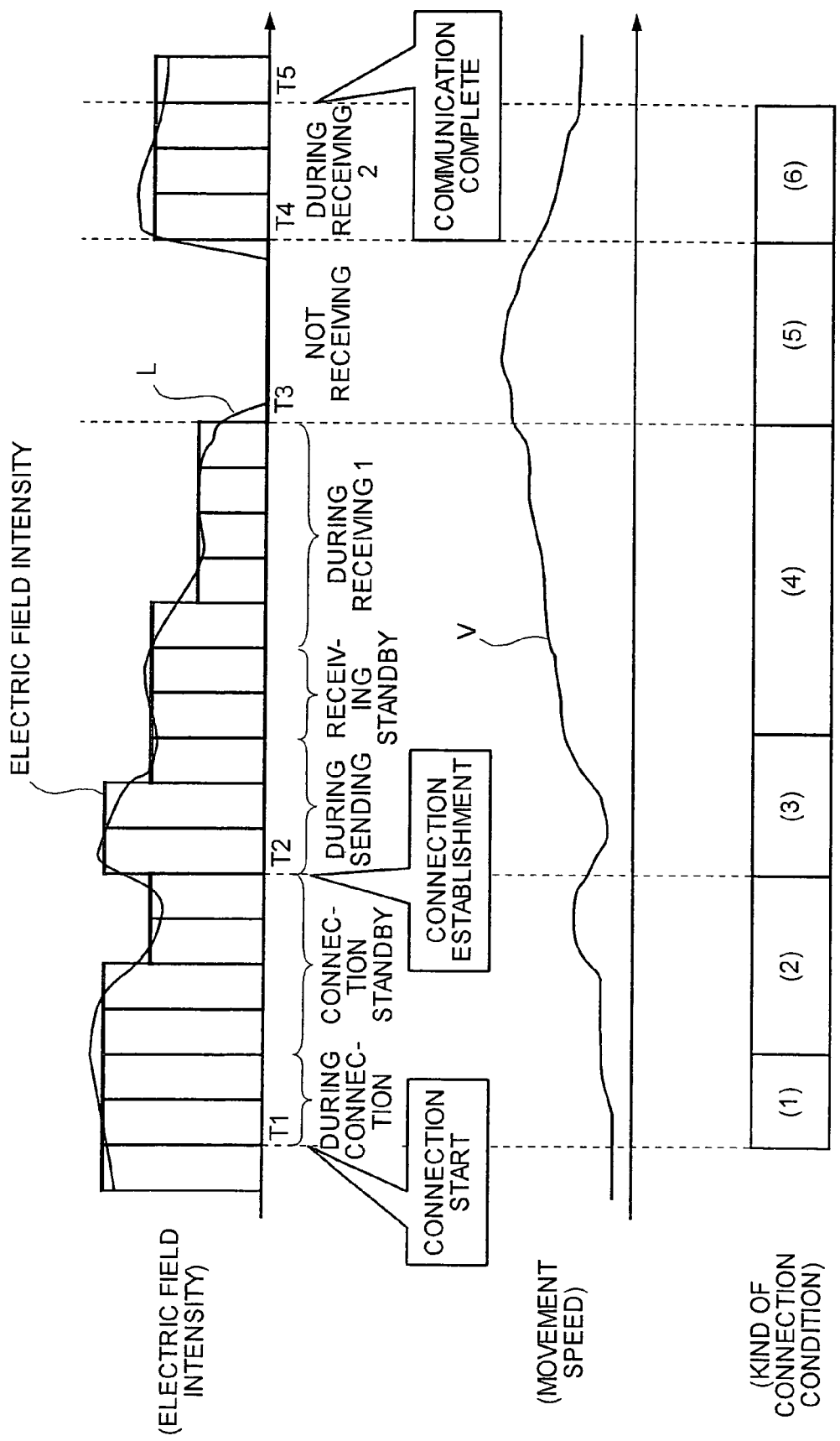
FIG. 9 is a figure of a movement speed of a mobile object and a time series change of an electric field intensity, and areas classified based on connection condition.

Herein, a concrete example of record of the distribution condition information is explained. FIG. 9 is a figure of the movement speed of a mobile object and the time series change of the electric field intensity, and areas classified based on the connection condition. In FIG. 9, the horizontal axis represents time. The curve L in the graph showing the electric field intensity is the actual electric field intensity of the communication device measured by the communication controlling unit 13, while the bar graph shows the steps into which the actual electric field intensity L is classified when the electric field intensity is classified into 4 steps. Meanwhile, the curve V in the graph showing the movement speed is the movement speed of the mobile object.

In this FIG. 9, the case where the communication device attached to the mobile object location providing device 10 carries out communications via line connection is explained as an example. Time T1 to T2 shows the condition where the communication device dials up to the connection destination and carries out negotiations with the modem before line connection is established. Time T2 to T3 shows the condition where connection is established, and the location information is sent, and kept waiting for receiving, and received. Time T3 to T4 shows the condition where communication cannot be made owing to radio wave shut-down by an obstacle or so. Time T4 to T5 shows the condition where a recovery from radio wave shut-down is made and communication is available again. In this time T4 to T5, the part to be continued of received data that was interrupted in the time T3 may be received, or in some systems where data cannot be received from the halfway thereof, data may be sent from the start once again.

As explained in the step S24 of the flow chart in FIG. 8, the areas of time T1 to T3 and T4 to T5 where data is being sent and received and the electric field intensity is larger than the specified value (the specified value being "0" in the example in FIG. 9) become the record objectives of the distribution condition information concerning the distribution speed. Namely, in the connection condition classification in FIG. 9, (1) sending condition before connection, (2) receiving condition before connection, (3) sending condition during connection, (4) receiving condition during connection, and (6) receiving condition during connection are recorded. Meanwhile, (5) becomes out of record objectives.

Figure 10:
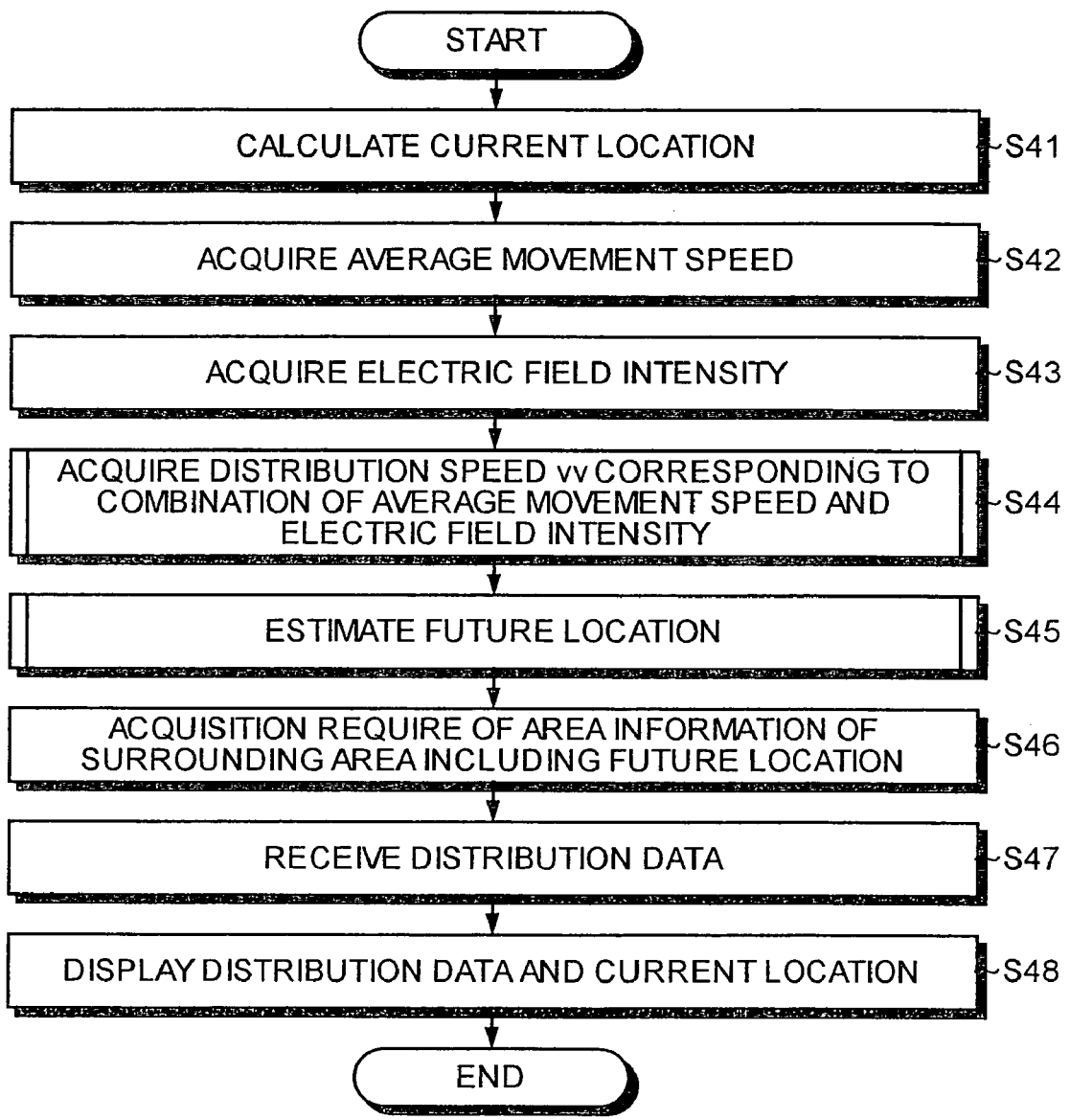
FIG. 10 is a flow chart of a process procedure for requesting data.

Next, the process at a request for area information from the user of the mobile object location providing device 10 is explained hereinafter. FIG. 10 is a flow chart of the process procedures of data request. First, when an area information acquisition request from the user of the mobile object location providing device 10 is received, the current location movement vector calculating unit 11 of the mobile object location providing device 10 calculates the current location (step S41), and acquires the average movement speed (step S42). This average movement speed is obtained by extracting the movement speed in the past specified period from the movement history storage unit 12, and calculating the average value thereof. Meanwhile, the communication controlling unit 13 acquires the electric field intensity of the communication device (step S43).

The distribution time estimating unit 16 acquires the distribution speed vv corresponding to the combination of the average movement speed and the electric field intensity acquired in the steps S42 to S43 from the distribution condition information storage unit 15 (step 844), and outputs the result thereof to the movement amount estimating unit 17. The movement amount estimating unit 17 estimates the movement distance from the current location for the distribution time from the past movement history stored in the movement history storage unit 12, and estimates the future location after lapse of the distribution time from the current time (step S45).

The estimated future location is output to the information displaying unit 19, and the information displaying unit 19 sends an acquisition request of the kind of area information of the surrounding area including the received future location that the user requires, for example, eating place information and entertainment facility information, via the communicating unit to the information center 4 (step S46).

The information center 4, based on the received area information acquisition request, searches for distribution date including area information of the surrounding area around the future location, and sends the distribution data to the mobile object location providing device 10. The mobile object location providing device 10 receives this distribution data via the communicating unit, and stores the data into the distribution data storage unit 18 (step S47). At this moment, the recording process of the distribution condition information shown in FIG. 8 is carried out. At the time when receiving this distribution data has completed, the mobile object will be around the future location estimated in the step S45. At completion of receiving the distribution data, the information displaying unit 19 displays the received distribution data over the map where the current location is displayed, on the displaying unit such as a display (step S48), thereby provides map information including area information to the user. Then the process is completed.

Figure 11:
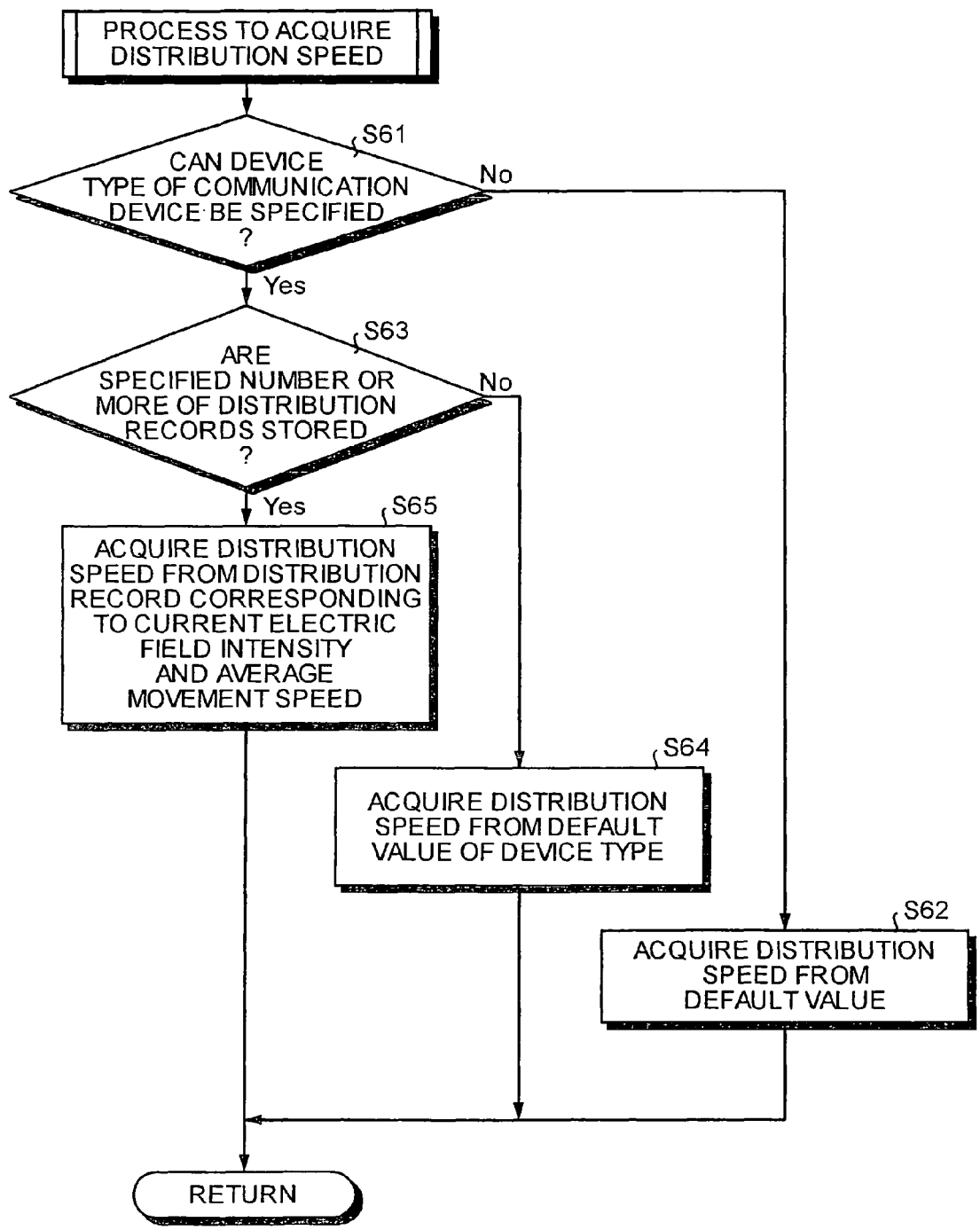
FIG. 11 is a flow chart of a process procedure for acquiring distribution speed.

Herein, the acquisition method of the distribution speed in the step S44 is explained in reference to the flow chart in FIG. 11 and FIG. 5. First, the distribution condition information recording unit 14 judges whether the device type of the communication device to be used in connection with the mobile object location providing device 10 can be specified (step S61). Namely, it judges whether the device type of the communication device is specified to the device information that the communication controlling unit 13 keeps. When the device type of the communication device cannot be specified (step S61: No), the distribution speed stored in the first default information in FIG. 5 is acquired (step S62), and the process is completed.

Meanwhile, when the device type of the communication device can be specified in the step S61 (step S61: Yes), it is judged whether a specified number or more of distribution records are stored in the distribution condition information in FIG. 5 corresponding to the device kind of the specified communication device (step S63). Herein, the specified number is the number of data that is necessary for using the distribution speed of the distribution condition information with a certain degree of precision, and an arbitrary value may be set. When the specified number or more of distribution records are not stored (step S63: No), the distribution speed stored in the second default information in the distribution condition information corresponding to the device type of the specified communication device is acquired (step S64), and the process is completed.

Meanwhile, when the specified number or more of distribution records are stored (step S63. Yes), the distribution speed corresponding to the average movement speed and the electric field intensity acquired in the steps S41 and S42, in the distribution records corresponding to the device type of the specified communication device is acquired (step S65), and the process is completed.

When the device type of the communication device cannot be specified in the step S61, in the step S62, the distribution condition information stored in the first default information is acquired, while, the device types (device identification) of the communication device registered in the distribution condition information storage unit 15 may be displayed on a display, and make the user select the closest device type to the device type of the communication device that the user owns from the device types, and thereby acquire the distribution condition information stored in the second default information storage unit of the selected device type.

Figure 12:
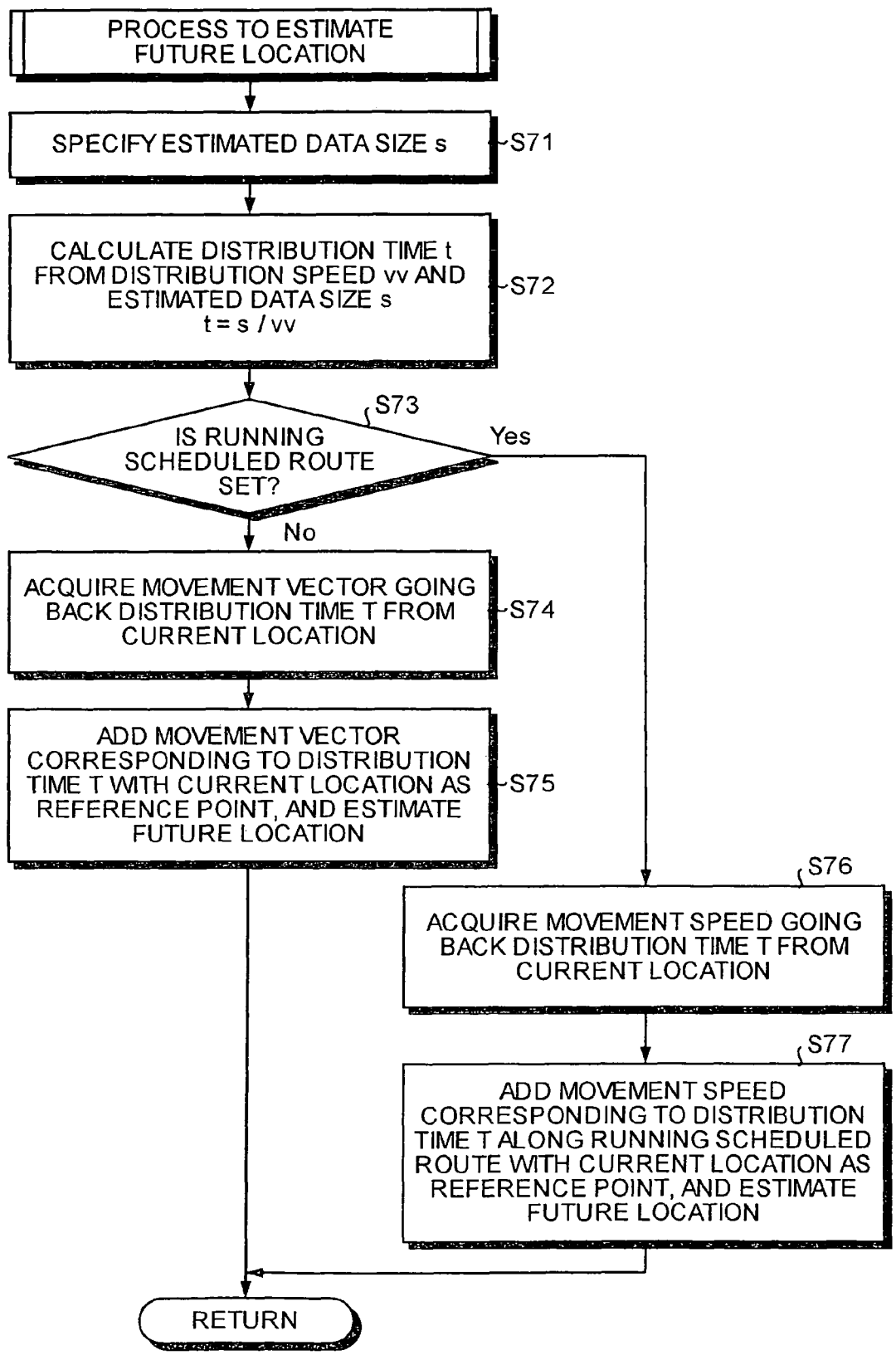
FIG. 12 is a flow chart of a process procedure for estimating the future location of the vehicle.

Next, one example of the method to estimate the future location in the step S45 in FIG. 10 is explained further in details in reference to the flow chart in FIG. 12. First, the communication controlling unit 13 specifies the estimated data size s of the distribution data to be distributed (step S71). The specification of this estimated data size s is carried out based on the distribution data size information that the communication controlling unit 13 keeps. Namely, the kind of data to be acquired is specified based on an area information request from the user, and the estimated data size s of the distribution data that coincides with this data kind is acquired. First, with regard to the specification of the data kind, for example, when the user request for acquisition of information about facilities and shops in an area, the data kind is judged as a surrounding data, and when the user requests for acquisition of an image map, then the date kind is specified as an image map. Further, since in the distribution data size information, as shown in FIG. 4, the number of data and the size of accumulated data are stored per data kind, the estimated data size s may be obtained by dividing the size of data of the specified data kind by the number of data.

Next, the distribution time estimating unit 16 calculates the distribution time t from the distribution speed vv obtained in the step S44 in FIG. 10, and the estimated data size s obtained in the step S71, by use of the following equation (1) (step S72).

$$t = s/vv \qquad (1)$$

Next, the movement amount estimating unit 17 judges whether the running scheduled route is set at present (step S73). When the running scheduled route is not set (step S73: No), the movement amount estimating unit 17 acquires the movement vector going back the calculated distribution time t from the current location from the movement history storage unit 12 (step S74). Then, with the current location calculated in the step S31 in FIG. 10 as a reference point, the movement amount estimating unit adds the movement vector corresponding to the distribution time t and thereby estimates the future location (step S75), and the process is completed.

Meanwhile, when the running scheduled route is set (step S73: Yes), the movement amount estimating unit 17 acquires the movement vector going back the calculated distribution time t from the current location (step S76), and outputs the movement vector to the information displaying unit 19. The information displaying unit 19, with the current location as a reference point, adds the sum of the movement speed corresponding to the distribution time t (namely, the sum of absolute values of the movement vector) along the running scheduled route and thereby estimates the future location (step S77), and the process is completed.

Figure 13A:
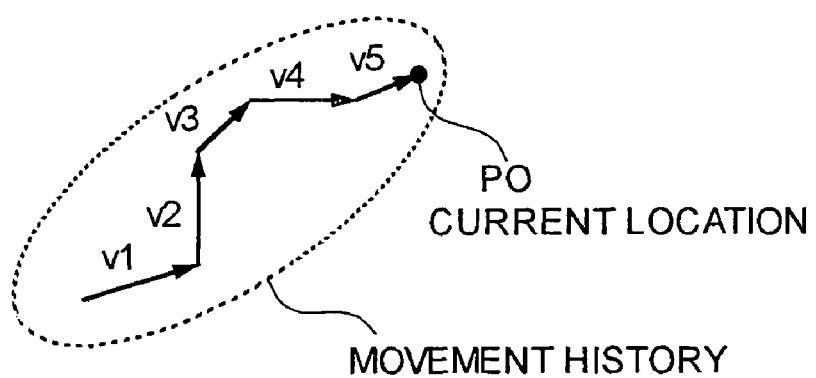
FIGS. 13A and 13B are schematics for explaining a method of estimating the future location when a scheduled route has not been set.
Figure 13B:
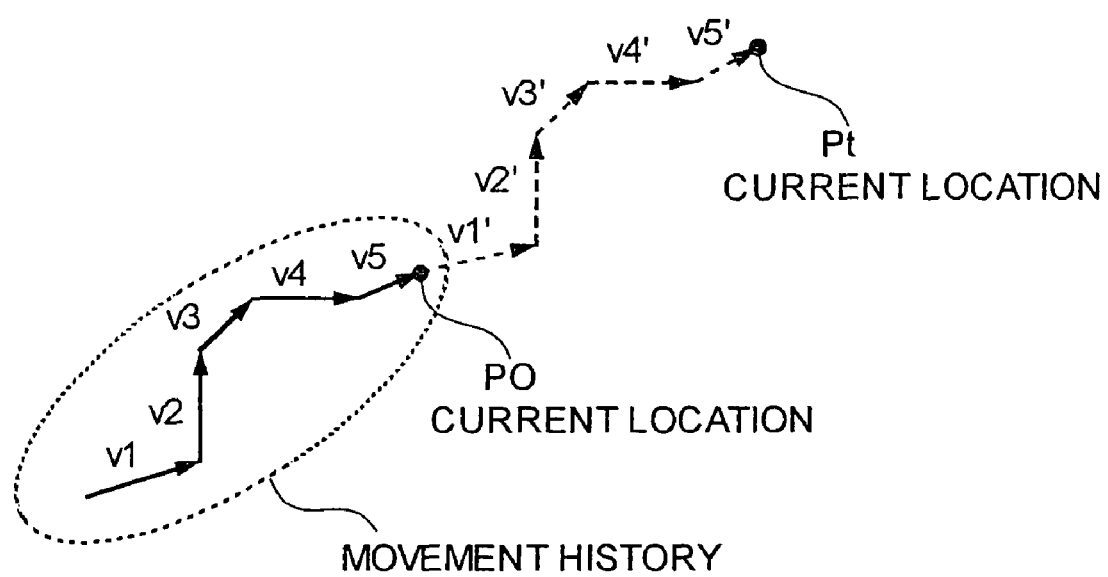

FIG. 13A and FIG. 13B are figures of an example of the method to estimate the future location when there is not the running scheduled route of the mobile object. The movement amount estimating unit 17 acquires the movement history about the movement vector consisting of the movement speed and the movement direction going back the distribution time t from the current location P0 from the movement history storage unit 12. The history of the movement vector going back the distribution time t from the current location is shown in FIG. 13A. Therein, the distribution time is 5 seconds, and the movement history for the past 5 seconds is shown as movement vectors v1 to v5. In the step S75, the movement amount estimating unit 17 adds the acquired movement vectors c1 to v5 to the current location P0. This process is shown in FIG. 13B. Therein, the vectors v1 to v5 and the vectors v1' to v5' have the same shape and direction mutually. As a result, the future location becomes the position Pt that the end point of the vector v5' indicates.

Figure 14A:
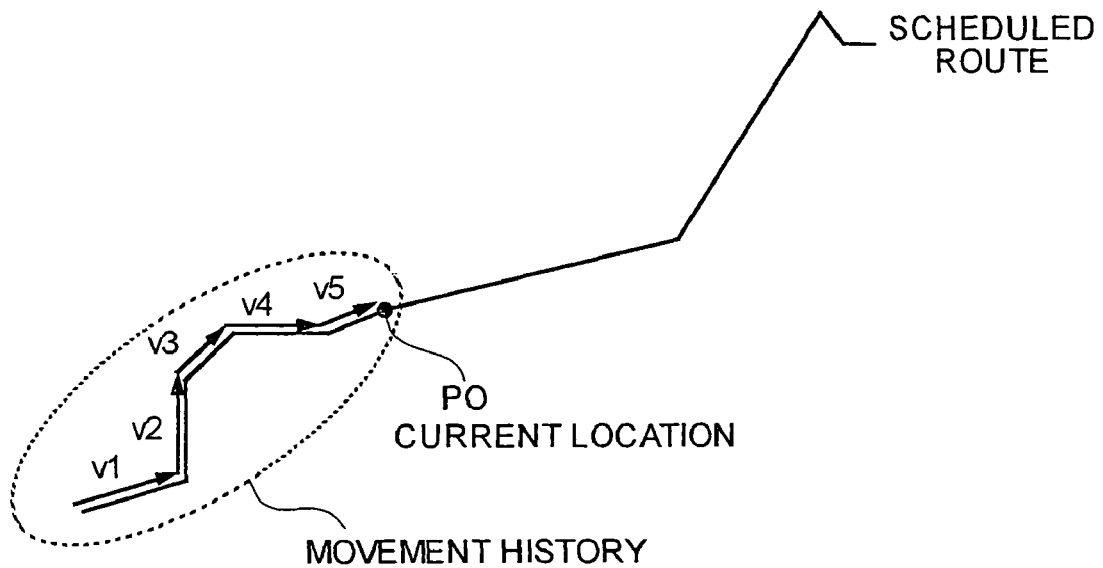
FIGS. 14A and 14B are schematics for explaining a method of estimating the future location when a scheduled route has been set.
Figure 14B:
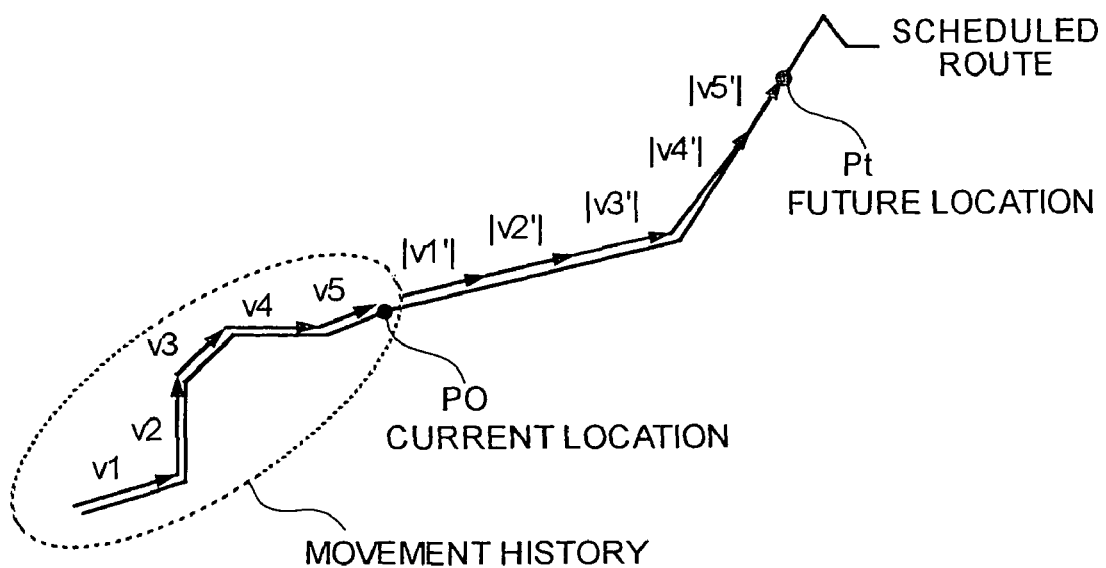

Meanwhile, FIG. 14A and FIG. 14B are figures of an example of the method to estimate the future location when there is the running scheduled route of a mobile object. The movement amount estimating unit 17 acquires the history about the movement speed going back the distribution time t (the absolute value of the movement vectors v1 to v5) from the current location P0 from the movement history storage unit 12 in the step S76. In FIG. 14A, the movement history (movement vectors) for the past five seconds and the running scheduled route are shown. In this case too, as same as in FIG. 13A and FIG. 13B, the distribution time is set 5 seconds. In the step S77, the information displaying unit 19 adds the sum of the movement speed (the sum of absolute values of the movement vectors) acquired from the movement amount estimating unit 17, along the running scheduled route with the current location P0 on the map as a reference point. As a result, as shown in FIG. 14B, the future location becomes the position Pt on the running scheduled route.

In the step S71, the estimated data size s is obtained from the distribution data size of the communication controlling unit 13, meanwhile, when the data size to be distributed is known in prior, the data size may be acquired by inquiring to the distribution source (information center) that distributes the data.

By the processes explained above, to the distribution data size information and the device information that the movement history storage unit 12, the distribution condition information storage unit 15, the distribution date storage unit 18 and the communication controlling unit 13 keep, a large amount of data is accumulated as the mobile object location providing device is used. Therefore, it becomes necessary to delete date in the respective units that store data. Herein, a data deleting unit is arranged further in the mobile object location providing device 10, and the data deleting process by this date deleting unit is explained hereinafter.

Figure 15:
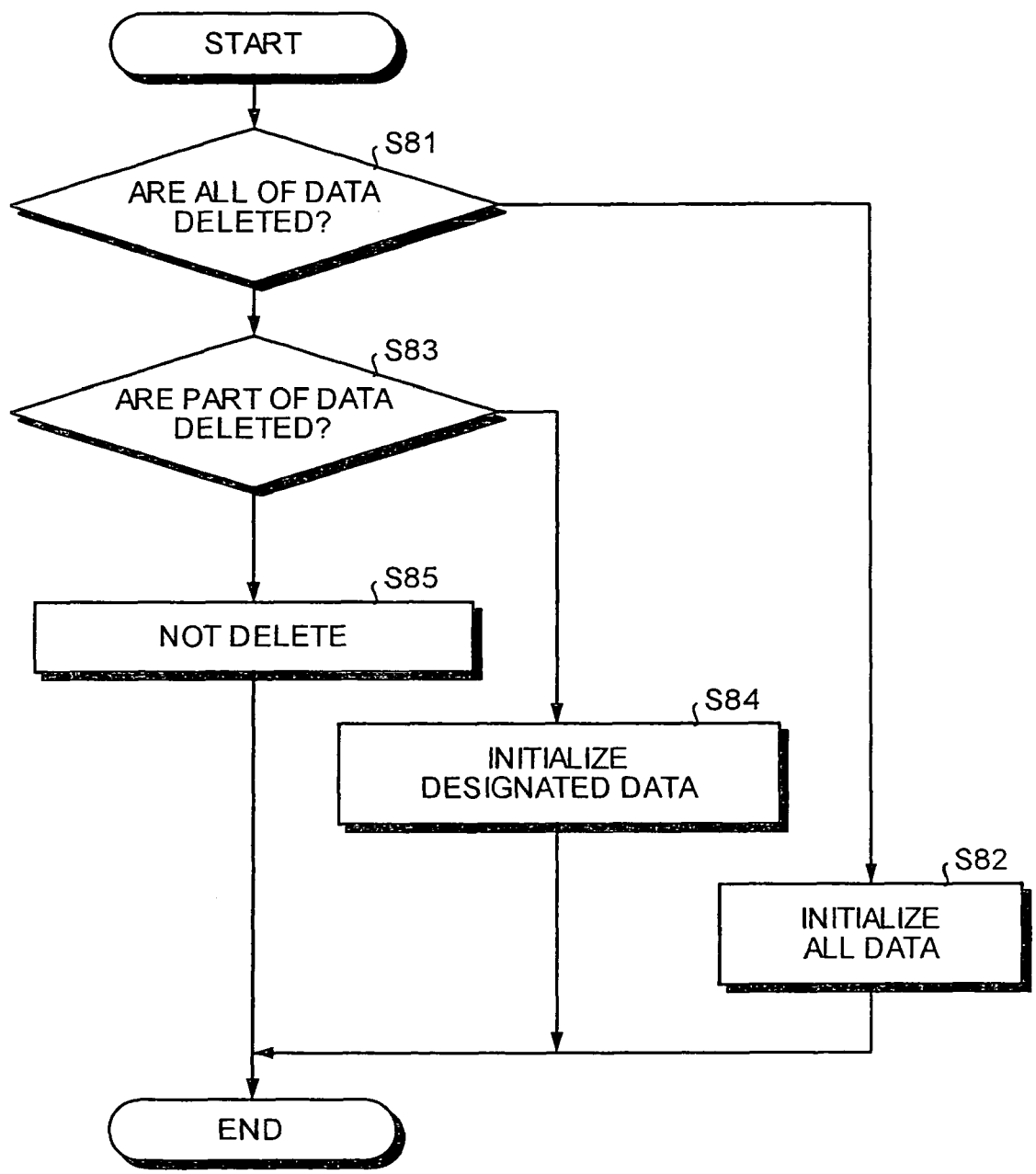
FIG. 15 is a flow chart of a process procedure for deleting data that is performed by a user of the data.

FIG. 15 is a flow chart of an example of the procedures of deleting process by instructions from the user of the mobile object location providing device. First, when the user selects a data delete command, the data deleting unit judges whether the contents of the delete command are to delete all the data (step S81). When it is the command to delete all the data (step S81: Yes), all the data in the storage units where the delete command is to be executed are initialized (step S82), and the process is completed.

Meanwhile, if the command is not the command to delete all the data (step S81: No), it is judged whether the delete command that the user has selected is the command to delete part of data (step 83). If it is the command to delete part of data (step S83: Yes), among the data in the storage units where the delete command is to be executed, the data designated by the user is initialized (step S84), and the process is completed. Meanwhile, if the command is not the command to delete part of data (step S83: No), the delete command is not executed (step S85), and the process is completed.

Figure 16A:
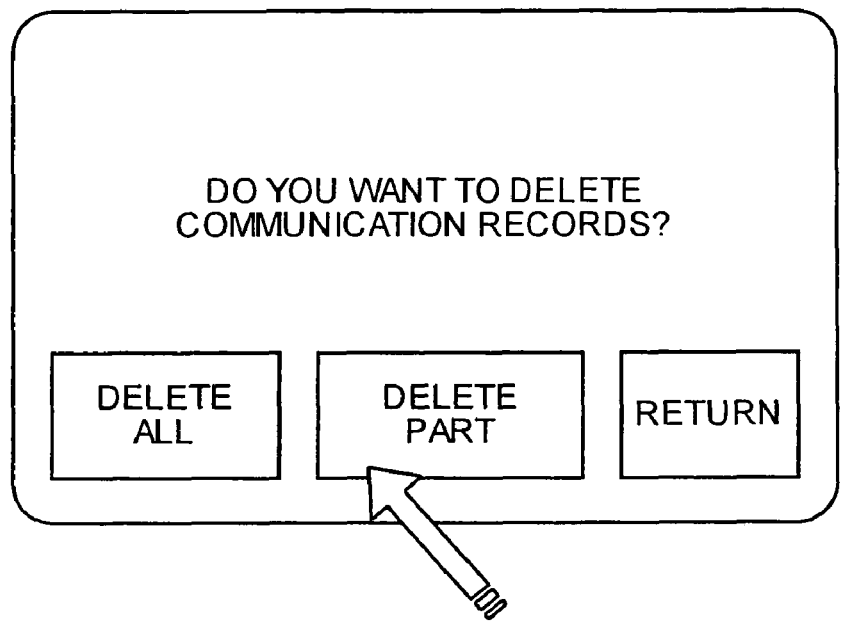
FIGS. 16A and 16B are examples of display screens displayed on a displaying unit when a delete command is applied to data in a distribution condition information storage unit.
Figure 16B:
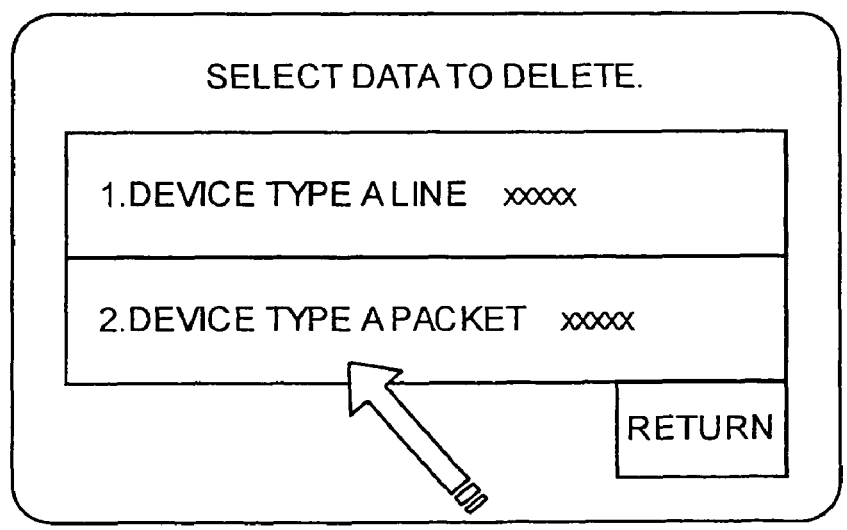

FIG. 16A and FIG. 16B are the figures each of an example of the display screen displayed on the displaying unit when the delete command shown in FIG. 15 is applied to the data in the distribution condition information storage unit. When the command to delete data is selected, a confirmation screen shown in FIG. 16A is displayed on the displaying unit. On this display screen, buttons to execute "Delete All" to delete all the data, "Delete Part" to delete part of the data, and "Return" to return to the previous screen without deleting data are displayed. The user may select these buttons with a mouse pointer or the like to execute the respective commands.

In FIG. 16A; when for example "Delete Part" is selected, a display screen shown in FIG. 16B is displayed. Herein, the case where the distribution condition information stored in the distribution condition information storage unit 15 is stored per communication kind as shown in FIG. 20 to be described later, and data is deleted by selection per communication kind, is displayed. Besides this, as a unit to delete the distribution condition information, deletion per communication system, per device type and the likes may be made. On this display screen, the commands that are selected by the user are executed.

In the mobile object location providing device 10 according to the present invention, even when the mobile object location providing device 10 itself does not have a communication function, the device allows to perform the processes mentioned above by connecting it to a communication device such as a cellular phone that the user has. In this case, there may be a possibility that after the manufacture and sale of the mobile object location providing device 10, a new type of cellular phone or the like and a new communication system are released, and when such a new communication device is connected to the mobile object location providing device 10, the mobile object location providing device 10 cannot judge the device type of the communication device concerned. Therefore, it is preferred to use a portable type medium such as a Memory Stick (registered trademark) that stores default information of new communication devices and so on, and thereby update the default information concerning the communication device of the distribution condition information storage unit 15 in the mobile object location providing device 10.

Figure 17:
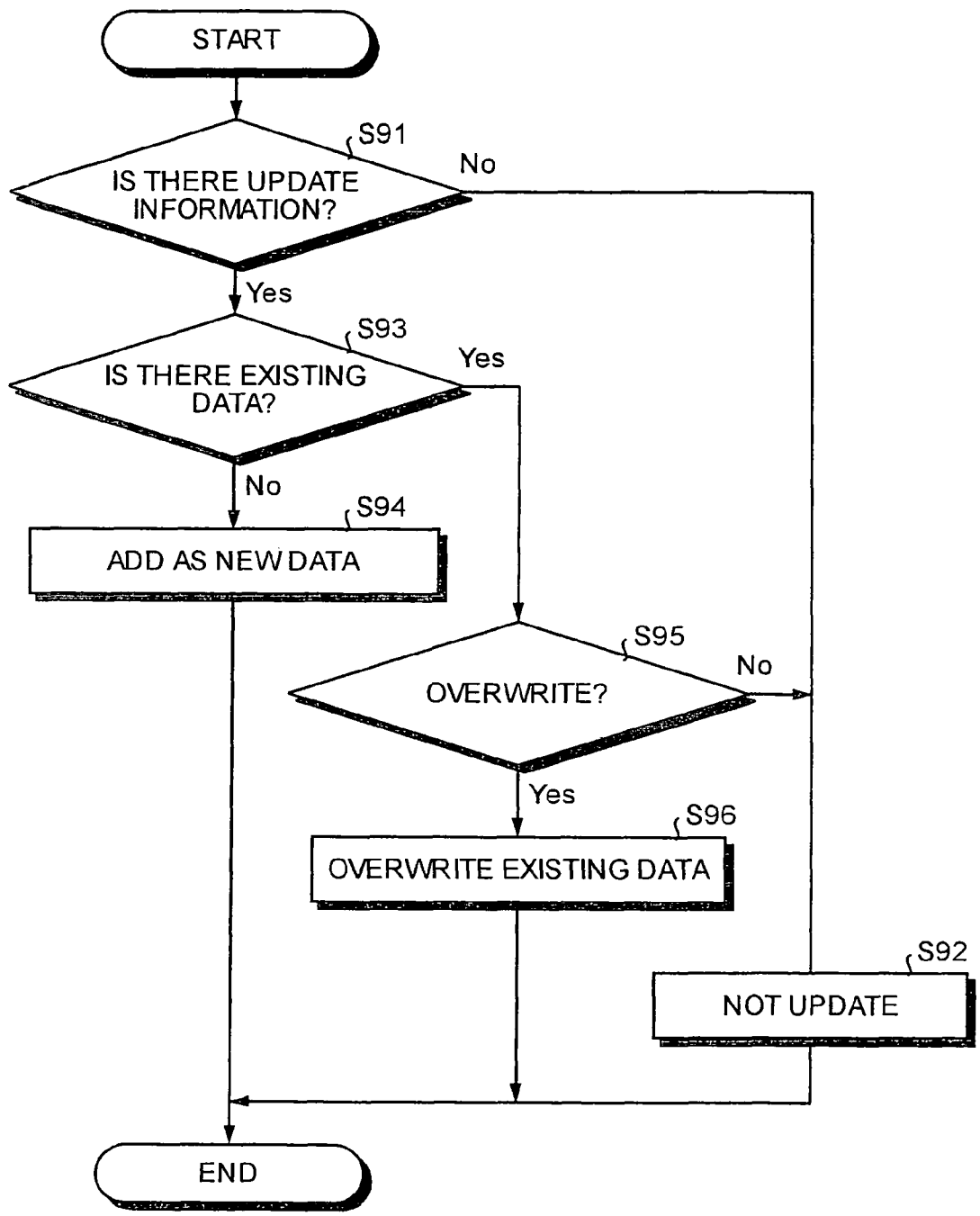
FIG. 17 is a flow chart of the process procedures to update default information of a distribution condition information storage unit.

FIG. 17 is a flow chart of the process procedures to update default information of the distribution condition information storage unit. First, when a portable type medium that stores default information concerning communication devices is inserted into a portable type medium reading unit arranged in the mobile object location providing device 101 it is judged whether there is update information in the portable type medium (step S91). When there is not update information (step S91: No), the update process is not carried out (step S92), and the process is completed. Meanwhile, when there is update information (step S91: Yes), it is judged whether the information corresponding to the update information already exists in the distribution condition information storage unit 15 (step S92).

When there is not existing data corresponding to the update information in the distribution condition information storage unit 15 (step S93: No), the update information in the portable type medium is stored as new data into the distribution condition information storage unit 15 (step S94). Meanwhile, when there is existing data corresponding to the update information in the distribution condition information storage unit 15 (step S93; Yes), it is confirmed whether to overwrite the update information to the user (step S95). When the user permits to overwrite the update information (step S95: Yes), the update information in the portable type medium is overwritten into the distribution condition information storage unit 15 (step S96), and the process is completed. When the user does not permit to overwrite the update information (step S95: No), the update process is not carried out (step S92), and the process is completed.

Heretofore, an embodiment of the structure and action processes of the mobile object location providing device 10 has been explained, but when the distribution condition information storage unit 15 is structured according to the method in FIG. 5, because into the distribution speed to be recorded at the second time and after by the combination of movement speed and electric field intensity, the average value of the distribution speed of the previous time already input, and the distribution speed that is to be input from now are input, there is a possibility that the difference from the actual average value may become large. Therefore, to obtain a far more precise distribution speed, as the distribution record of the distribution condition information, in the place of recording the distribution speed as shown in FIG. 5B, as shown in FIG. 18, the distribution data size and the distribution time may be recorded. In this case, the distribution speed in the step S34 in FIG. 10 may be obtained by dividing the distribution data size by the distribution time, as a result, the distribution speed may be far more precise than the distribution time obtained in FIG. 5B.

Further, when the distribution condition information storage unit 15 is structured according to the method in FIG. 5, it is necessary to take a capacity for storing distribution condition information for the number of kinds of communication devices. To cope with this, as shown in FIG. 19, by sharing the distribution condition information of device types which are different but whose communication performances may be regarded as same, it is possible to reduce the data amount. In the example shown in FIG. 19, device types A, B, and C of communication devices are classified as a same device identification, and the device types D, E, and F are classified as a same device identification, . . . , and the device types X, Y, and Z are classified as a same device identification.

Further, when there are plural communication methods whose device types are same but whose communication performances are different, when there are two kinds of communication methods, for example, line switching method and packet method, if distribution condition information of both the methods is accumulated in a same classification, there is a problem that data reliability is deteriorated. Therefore, as shown in FIG. 20, distribution condition information may be recorded in classification per communication method to the same device identification.

Furthermore, as shown in FIG. 21A, in the case of classification by same device types, distribution condition information may be further classified by connection destinations. For example, in the communication devices classified by the device identification "A", distribution condition information is stored into different connection destinations A-1 to A-3. Further, as shown in FIG. 21B, in the case of classification by same device types, distribution condition information may be classified by communication time periods (time zones). Classification by communication time periods is effective when line traffics vary conspicuously with time periods. Further, as shown in FIG. 22, communication time periods may be divided into record before connection and record during connection where communication contents are different, and for example in the example in FIG. 9, communication time periods may be divided into time period before connection establishment T1 to T2, and time periods after connection establishment T2 to T3, and T4 to T5, and thereby distribution condition information may the recorded. Moreover, distribution condition information may the recorded in combination of FIG. 5 and FIG. 18 to FIG. 22.

According to the first embodiment, where the movement history storage unit 12 that stores the current location and the movement vector of the mobile object 1, and the distribution condition information storage unit 15 that stores the distribution speed at which distribution data is distributed to the combination of the movement speed of the mobile object 1 and the electric field intensity of the communication device are arranged, and at a data acquisition request from the user, the distribution time 18 obtained from the average movement speed and the electric field intensity and the distribution data size, and the future location after the distribution time is estimated from the current location, and area information at this future location is requested, accordingly, an advantageous effect is attained that it is possible to make the relation between the position to receive distribution data and the contents of area information included in distribution data far more precisely consistent.

Further, the distribution speed at which distribution data is distributed is accumulated to the combination of the movement speed of the mobile object 1 and the electric field intensity of the communication device, and data kinds, data size and number of times of distribution date are accumulated, accordingly, another advantageous effect is attained that it is possible to prevent fluctuations of parameters in estimating the future location, and thereby to estimate the future location far more precisely.

Furthermore, distribution condition information is accumulated per different communication system, and per different device type in a same communication system, and further per different communication method in a same device type, accordingly, still another advantageous effect is attained that it is possible to cope with communication devices of different communication systems, device types, and communication methods.

In the first embodiment, the structure where the mobile object location providing device 10 is arranged to the communication device 5 of the mobile object 1 in FIG. 1 is explained, meanwhile as a second embodiment, the case where the mobile object location providing device 10 is arranged to the information center 4 is explained hereinafter.

Figure 23:
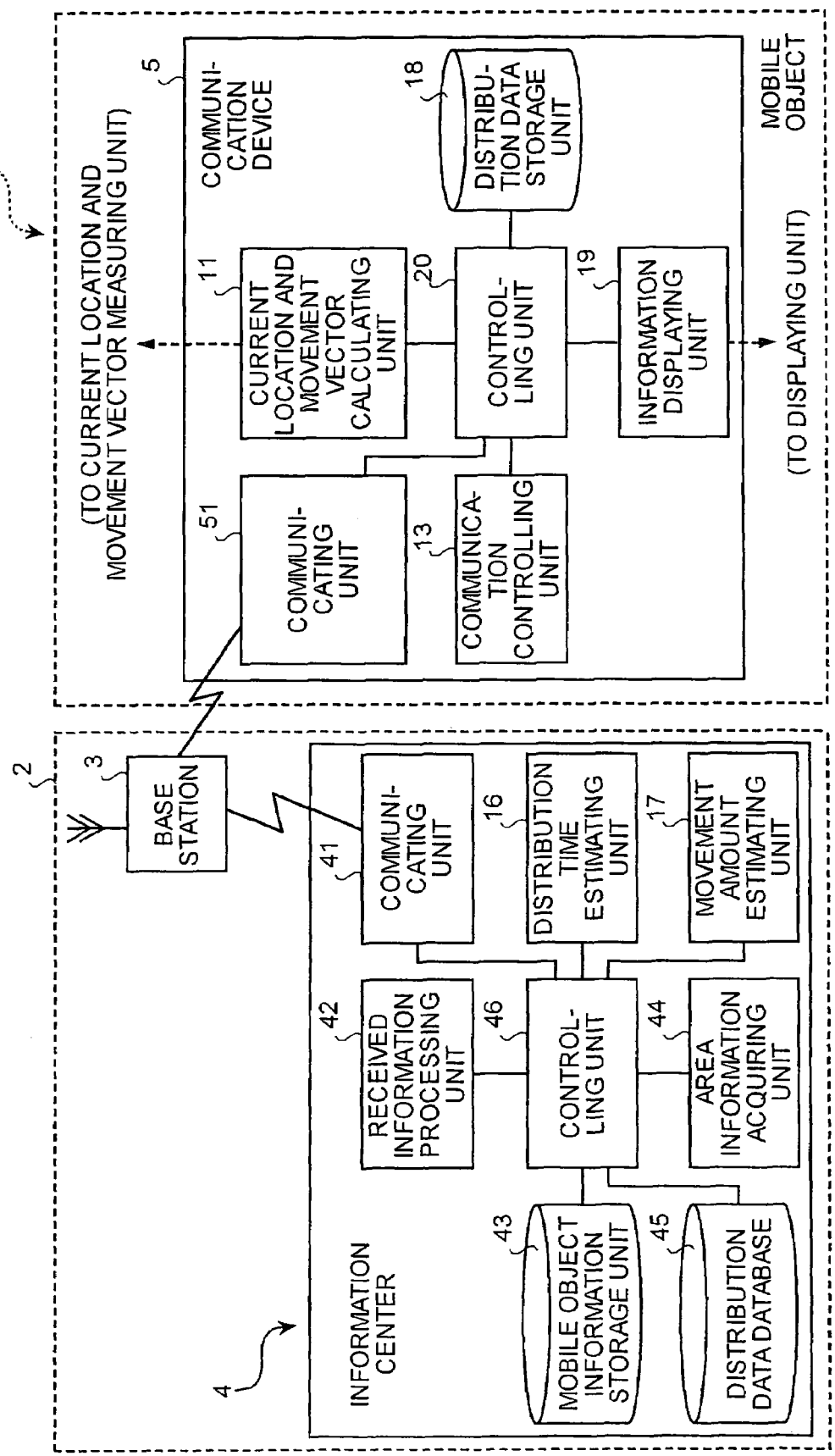
FIG. 23 is a block diagram of a mobile object location providing system according to the embodiment of the present invention.

FIG. 23 is a block diagram of a rough structure of a mobile object location providing system including a mobile communication network having an information center having a mobile object location providing device according to the present invention and a mobile object. By the way, identical codes are allotted to functional units that carry out the same roles as those of the components shown in FIG. 2, and detailed explanations thereof are omitted herein.

A communication device 6 of a mobile object 1 includes a communicating unit 51 that carries out communications with a mobile communication network 2 and to which a communication device such as a cellular phone of a user of the communication device 5 is connected, a current location movement vector calculating unit 11 that calculates the current location and movement vector of the mobile object 1, a communication controlling unit 13 that acquires device information such as the communication method and the device kind and the likes of the communication device arranged at the communicating unit 51, electric field intensity, time required for sending and receiving data and data size and so forth and sends them to an information center 4, a distribution data storage unit 18 that stores distribution data distributed from the information center 4, an information displaying unit 19 that requests instructions from a user to the information center 4, and displays the distribution data from the information center 4 to the user, and a controlling unit 20 that controls these components.

Meanwhile, the information center 4 includes a communicating unit 41 that carries out communications via the mobile communication network 2 with the mobile object 1, a received information processing unit 42 that receives mobile object information including device information, distribution date size information, distribution condition information, and movement history information of the mobile object 1 and stores them into a mobile object information storage unit 43, the mobile object information storage unit 43 that stores mobile object information, a distribution time estimating unit 16 that estimates distribution time to send distribution data according to instructions from the mobile object 1, a movement amount estimating unit 17 that obtains the movement amount of the mobile object 1 from the estimated distribution time and thereby estimates a future location, an area information acquiring unit 44 that acquires area information that the user of the communication device 5 of the mobile object 1 wants from a distribution data database 45 based on the estimated future location, the distribution data database 45 that stores area information in the mobile communication network 2, and a controlling unit 46 that controls these components.

Figure 24:
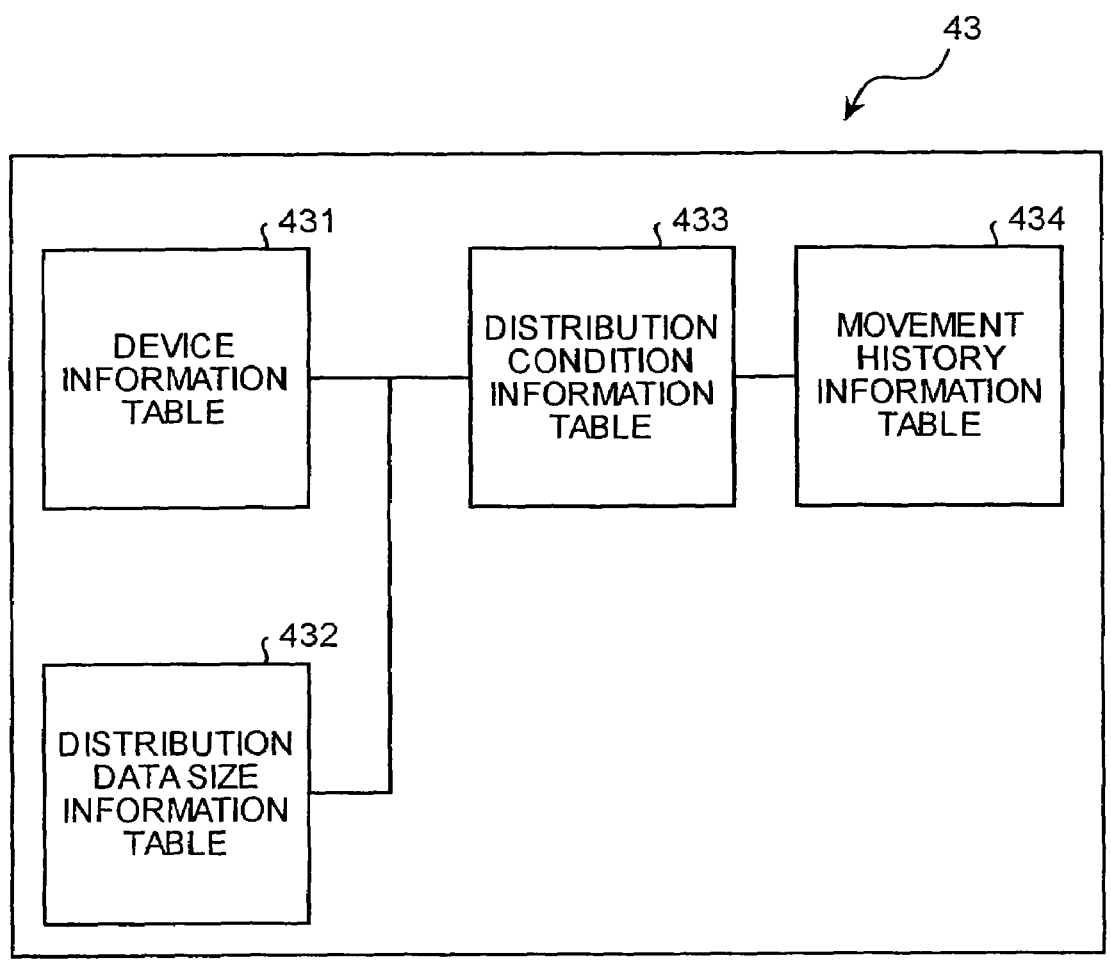
FIG. 24 is a schematic diagram of an example of a table structure of a mobile object information storage unit.

FIG. 24 is a schematic diagram of the structure of the mobile object information storage unit. The mobile object information storage unit 43 is so structured that a device information table 431 that stores the device information which the communication controlling unit 13 kept in the first embodiment, a distribution data size information table 432 that stores distribution data size information which the communication controlling unit 13 shown in FIG. 4 in the first embodiment kept, a distribution condition information table 433 that stores distribution condition information which was stored in the distribution condition information storage unit 15 shown in FIG. 5 in the first embodiment, and a movement history information table 434 that stores the movement history information that was stored in the movement history storage unit 12 shown in FIG. 3 in the first embodiment are mutually related per user. However, with regard to distribution condition information, distribution condition information that is obtained per a same communication system or per same or similar device type in a same communication system is stored in bulk, and this same communication system or same or similar device type in a same communication system and users are mutually related. Meanwhile, the distribution condition information table 433 may store distribution condition information in the formats shown in FIG. 18 to FIG. 22, in the same manners as in the first embodiment, and store distribution condition information in combination of these and FIG. 5.

The action processes in this mobile object location providing system are basically same as the action processes explained in the first embodiment, though there is an additional process to send and receive the current location, movement vector, device information and the likes between the communication device 6 of the mobile object 1 and the information center 4, therefore, explanations thereof are omitted herein. Nevertheless, in this second embodiment, as shown in the structural drawing in FIG. 23, the structure is so made that the process to estimate the future location of the mobile object 1 is performed based on these information items at the side of the information center 4, accordingly, the mobile object 1 minutely sends device information including information of the device type used in the communicating unit 51, current location and movement vector, electric field intensity of the communicating unit 51 during communication and size of sent and received data and time required for sending and receiving data, to the information center 4. Area information of surrounding area including the future location is searched for and extracted from the distribution data database 45 by the area information acquiring unit 44, and the result thereof is sent to the mobile object 1.

According to the second embodiment, the communication device 5 that the mobile object 1 has sends the device information, the distribution data size information, the distribution condition information and the movement history information acquired about the mobile object 1 to the information center 4, and at acquisition of area information by the user of the communication device 5, the future location of the mobile object 1 is estimated at the information center 4 based on these information items and the area information of the surrounding area including the future location is distributed to the mobile object 1, accordingly, an advantageous effect is attained that it is possible to make the interrelation between the position to receive distribution data and the contents of area information included in distribution data far more precisely consistent. Further, the distribution condition information that is classified by a same device type and the like concerning the communicating unit 51 that the mobile object 1 has is accumulated by users of a same device type in this system, accordingly, another advantageous effect is attained that it is possible to increase the reliability of the distribution condition information, and to enhance the precision of the distribution time estimation. Furthermore, still another advantageous effect is attained that it is possible to reduce the load of processes at the side of the mobile object 1.

In the first and the second embodiments mentioned above, explanations have been made with the case where the mobile object 1 is a vehicle having the communication device 5 as an example, however, the present invention is not limited to this. For example, the functions of the communication device 5 explained in the first and the second embodiments may be loaded into a portable communication device such as a PDA (Personal Digital Assistant) having a communication function and a function to measure the current location by use of a GPS. In this case, the user of the communication device 6 may cope with various conditions including walking condition, condition riding on a bicycle or the like, condition moving on a car, and so forth.

According to an aspect of the present invention, a mobile object location providing device is so structured as to have a distribution time estimating unit that estimates distribution time of distribution data according to the kind of the communicating unit, by use of distribution condition information concerning time required for distribution of the distribution data per kind of the communicating unit, and a future location estimating unit that estimates the future location of the mobile object after lapse of the distribution time from the current location, by use of the movement history, and requests for distribution of area information of the surrounding area including the future location. Accordingly, it becomes possible to obtain the future location of the mobile object further more precisely, and to obtain information suitable for the location of the mobile object. Further, distribution condition information is prepared per kind of the communicating unit, which may cope also with the case where plural kinds of mobile communication terminals such as cellular phones and the likes are connected to the mobile object location providing device.

Furthermore, the mobile object location providing device is so structured as to further have a distribution condition information recording unit that acquires distribution condition information when the distribution data is received, and records the distribution condition information into the distribution condition information storage unit. Accordingly, an advantageous effect may be attained that it is possible to estimate the future location of the mobile object based on the distribution condition information at actual communication by the communicating unit arranged in the mobile object location providing device.

Furthermore, the mobile object location providing device is so structured that the distribution condition information is recorded per kind of the communicating unit, and according to the movement speed of a mobile object and the communication condition of the communicating unit, and the distribution time estimating unit estimates the distribution time by use of distribution condition information to be determined by the movement speed of the mobile object and the kind and communication condition of the communicating unit. Accordingly, it becomes possible to estimate the future location of a mobile object based on the actual-communication conditions accumulated by the communicating unit arranged in the mobile object location providing device.

Moreover, the mobile object location providing device is so structured as to further have a distribution data size storage unit that stores distribution data size information concerning data size for one piece of data per data kind, therefore, even when the size of distribution data is unknown, the data size of distribution data is estimated by use of statistics per data kind, as a result, the possibility of the data size becoming away from the actually distributed data size is low. Accordingly, it becomes possible to obtain the distribution time of distribution data with a certain level of precision.

Furthermore, the mobile object location providing device is so structured that communications by the communicating unit are classified according to a specified standard, and the distribution condition information is recorded according to the classification. Accordingly, an advantageous effect may be attained that it is possible to estimate distribution time and further future location by use of far more reliable distribution condition information.

Moreover, the mobile object location providing device is so structured that the distribution condition information is distribution speed, accordingly, an advantageous effect may be attained that it is possible to easily calculate distribution time if the size of distribution data is known. Further, it is so structured that the distribution condition information is the data size of the distribution data and the distribution time of the distribution data concerned. Accordingly, when storing distribution condition information in accumulated manners, it is possible to obtain a distribution speed far more precisely than the case when to store a distribution speed in single manners.

Moreover, the mobile object location providing device is so structured that the future location estimating unit extracts a movement vector consisting of a movement speed and a movement direction of the mobile object going back the distribution time from the current location as a movement history, and adds the extracted movement vector to the current location and thereby estimates the future location of the mobile object. Accordingly, an advantageous effect may be attained that it is possible to estimate the future location even if the running scheduled route of the mobile object is not set.

Further, the mobile object location providing device is so structured that the future location estimating unit extracts the movement speed of the mobile object going back the distribution time from the current location as a movement history, and adds the movement distance to be obtained from the extracted movement speed to the current location on the running scheduled route and thereby estimates the future location of the mobile object. Accordingly, an advantageous effect may be attained that it is possible to increase the estimation precision of the future location when a running scheduled route of the mobile object is set.

Furthermore, the mobile object location providing device is so structured that the distribution condition information storage unit further has a first default information that stores distribution condition information concerning a specified kind of communicating unit, and the distribution time estimating unit, when the kind of communicating unit cannot be specified, refers to the first default information and thereby estimates the distribution time. Accordingly, an advantageous effect may be attained that it is possible to take measures even when there is no distribution condition information about communicating unit corresponding to the communicating unit connected to the mobile object location providing device in the distribution condition information storage unit.

Moreover, the mobile object location providing device is so structured that the distribution condition information storage unit further has a second default information that stores the distribution condition information of communicating unit per kind of the communicating unit, and the distribution time estimating unit, when a specified number or more of the distribution condition information corresponding to the kind of the communicating unit is not recorded, refers to the second default information and thereby estimates the distribution time. Accordingly, an advantageous effect may be attained that it is possible to estimate the future location by use of a far reliable default value, when the accumulated number of actual distribution condition information concerning the communicating unit arranged in the mobile object location providing device is small.

Further, according to another aspect of the present invention, a mobile object location providing device to be arranged at an information center is so structured as to have a mobile object information storage unit that stores distribution condition information concerning time required for distribution of distribution data per kind of the communicating unit of the information provides, a distribution time estimating unit that, at an area information acquisition request from the information provides, by use of the distribution condition information to be specified from the input kind of the communicating unit of the information providee, estimates distribution time of distribution data including the area information, and a movement amount estimating unit that estimates the future location of the information providee after lapse of the distribution time, by use of the input current location and movement history of the information provide. Accordingly, an advantageous effect may be attained that it is possible to estimate the future location of the information providee far more precisely. Further, distribution condition information is prepared per kind of the communicating unit, which may enable to cope also with the case where plural kinds of mobile communication terminals such as cellular phones and the likes are connected to an information provides.

Furthermore, the distribution condition information is distribution condition information received from the information provide. Accordingly, an advantageous effect may be attained that it is possible to estimate the future location of the information providee based on the distribution condition information at actual communication by the communicating unit of the information providee.

Moreover, the distribution condition information is distribution condition information recorded per kind of the communicating unit of the information providee, and according to the movement speed of the information providee and the communication condition of the communicating unit, and the distribution time estimating unit estimates the distribution time by use of distribution condition information according to the kind and movement speed of the communicating unit of the information providee and the communication condition of the communicating unit, accordingly, an advantageous effect may be attained that it is possible to estimate the future location of the information providee based on the actual communication conditions accumulated by the communicating unit that the information providee has.

Further, the movement history is a movement vector consisting of a movement speed and a movement direction of the information providee going back the distribution time from the current location, and the movement amount estimating unit adds the movement vector to the current location and thereby estimates the future location of the information providee, accordingly, an advantageous effect may be attained that it is possible to estimate the future location even if the running scheduled route of the mobile object is not set.

Further, the movement history is the movement speed of the information providee going back the distribution time from the current location, and the movement amount estimating unit adds the movement distance to be obtained from the movement speed to the current location on the running scheduled route and thereby estimates the future location of the information providee, accordingly, an advantageous effect may be attained that it is possible to increase the estimation precision of the future location when a running scheduled route of the mobile object is set.

Furthermore, according to still another aspect of the present invention, where a mobile object location providing system is so structured as to have a mobile object that has a current location movement history calculating unit that calculates the current location and movement history of the mobile object, and a communication controlling unit that acquires the kind of the communicating unit of the mobile object, and sends the kind together with the calculated current location and movement history to the information center, and an information center that has a mobile object information storage unit that stores distribution condition information concerning time required for distribution of distribution data per kind of the communicating unit of the mobile object, a distribution time estimating unit that, at an area information acquisition request from the mobile object, extracts distribution condition information based on the communicating unit of the mobile object from the mobile object information storage unit, and by use of the distribution condition information, estimates distribution time of distribution data including the area information, a movement amount estimating unit that estimates the future location of the mobile object after lapse of the distribution time from the current location of the mobile object by use of the movement history, and an area information acquiring unit that acquires area information of the surrounding area including the estimated future location from the distribution data database, accordingly, an advantageous effect may be attained that it is possible to obtain the future location of the mobile object further more precisely, and obtain information suitable for the location of the mobile object. Further, distribution condition information is prepared per kind of the communicating unit, which may enable to cope also with the case where plural kinds of mobile communication terminals such as cellular phones and the likes are connected to the information center.

Moreover, the communication controlling unit of the mobile object is further has a function that acquires distribution condition information concerning the communicating unit and sends the distribution condition. Information to the information center, accordingly, an advantageous effect may be attained that it is possible to estimate the future location of the mobile object based on the distribution condition information at actual communication by the communicating unit arranged in the mobile object.

Further, the distribution condition information is recorded, per kind of the communicating unit, and according to the movement speed of the mobile object and the communication condition of the communicating unit, and the distribution time estimating unit of the information center extracts distribution condition information according to the movement speed of the mobile object and the kind and communication condition of the communicating unit from the mobile object information storage unit, and estimates the distribution time by use of the distribution condition information, accordingly, an advantageous effect may be attained that it is possible to estimate the future location of the mobile object based on the actual communication conditions accumulated by the communicating unit arranged in the mobile object.

Furthermore, the communication controlling unit of the mobile object is so structured as to further have a function to acquire distribution data size information concerning data size for one piece of data per data kind of distribution data, and send the distribution data size information to the information center, accordingly, an advantageous effect may be attained that, even when the size of distribution data is unknown, it is possible to obtain the distribution time of distribution data with a certain level of precision.

Moreover, the movement amount estimating unit of the information center extracts a movement vector consisting of a movement speed and a movement direction of the mobile object going back the distribution time from the current location of the mobile object as a movement history, and adds the extracted movement vector to the current location and thereby estimates the future location of the mobile object, accordingly, an advantageous effect may be attained that it is possible to estimate the future location even if the running scheduled route of the mobile object is not set.

Further, the movement amount estimating unit of the information center extracts the movement speed of the mobile object going back the distribution time from the current location of the mobile object as a movement history, and adds the movement distance to be obtained from the extracted movement speed to the current location on the running scheduled route and thereby estimates the future location of the mobile object, accordingly, an advantageous effect may be attained that it is possible to increase the estimation precision of the future location when a running scheduled route of the mobile object is set.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An information center comprising:
    a distribution data database that stores area information of a predetermined area;
    an area information acquiring unit that, upon receiving an area information request from a mobile object location providing device, mounted on a mobile object, having a communicating unit, searches for area information of an area surrounding a location of the mobile object in the distribution data database and thereby acquires area information, and sends the acquired area information as distribution data to the mobile object location providing device;
    a mobile object information storage unit that stores distribution condition information that includes information about time required for distribution of distribution data for a type of the communicating unit of the mobile object location providing device;
    a distribution time estimating unit that, upon receiving an area information acquisition request from the mobile object location providing device, estimates distribution time that is time for distributing the distribution data to the mobile object location providing device based on input distribution condition information identified by the type of communicating unit of the mobile object location providing device; and
    a movement amount estimating unit that estimates a future location of the mobile object after lapse of the distribution time based on input current location and input movement history of the mobile object, wherein the area information acquiring unit acquires area information of an area surrounding the estimated future location and sends to the mobile object location providing device, and wherein the distribution condition information is the distribution condition information recorded for the type of the communicating unit of mobile object location providing device according to the movement speed of the mobile object and a communication condition of the communicating unit, and the distribution time estimating unit estimates the distribution time by use of the type of the communicating unit of the mobile object location providing device, the movement speed of the mobile object and the distribution condition information in response to the communication condition of the communicating unit.

2. The information center according to claim 1, wherein the distribution condition information is the distribution condition information received from the mobile object location providing device.

3. The information center according to claim 1, wherein the movement history is a movement vector consisting of the movement speed and the movement direction of the mobile object going back the distribution time from the current location, and the future location estimating unit adds the movement vector to the current location and thereby estimates the future location of the mobile object.

4. The information center according to claim 1, wherein, when a running scheduled route of the mobile object is set, the movement history is the movement speed of the mobile object going back the distribution time from the current location, and the movement amount estimating unit adds the movement distance to be obtained from the movement speed to the current location on the running scheduled route and thereby estimates the future location of the mobile object.

5. A mobile object location providing system comprising:
a mobile object location providing device being mounted on a mobile object and having a communicating unit; and
an information center that, upon receiving an area information acquisition request from the mobile object location providing device, identifies a location of the mobile object, and acquires area information of an area surrounding the location of the mobile object from a distribution data database that stores area information of a predetermined area, and transmits the area information acquired as distribution data to the mobile object location providing device, wherein
the mobile object location providing device includes:
a current location movement history calculating unit that calculates a current location and a movement history of the mobile object; and
a communication controlling unit that acquires a type of the communicating unit of the mobile object location providing device, and sends the type of the communicating unit of the mobile object location providing device current location, and the movement history to the information center, and
the information center includes:
a mobile object information storage unit that stores distribution condition information including information about time required for distribution of distribution data to the mobile object for the type of the communicating of the mobile object location providing device;
a distribution time estimating unit that, upon receiving an area information acquisition request from the mobile object location providing device, extracts the distribution condition information based on the type of the communicating unit of the mobile object providing device from the mobile object information storage unit, and estimates distribution time that is time for distributing the distribution data to the mobile object based on the distribution condition information extracted;
a movement amount estimating unit that estimates a future location of the mobile object after lapse of the distribution time from the current location of the mobile object based on the movement history; and
an area information acquiring unit that acquires area information of the area surrounding the future location from the distribution data database and sends to the mobile object location providing device, wherein the distribution condition information is recorded for the type of the communicating unit of the mobile object location providing device according to the movement speed of the mobile object and a communication condition of the communicating unit, and the distribution time estimating unit of the information center extracts the distribution condition information from the mobile object information storage unit, and estimates the distribution time by use of the type of communicating unit of the mobile object location providing device, the movement speed of the mobile object, and the distribution condition information in response to the communication condition of the communicating unit.

6. The mobile object location providing system according to claim 5, wherein the communication controlling unit of the mobile object further has a function that acquires distribution condition information concerning the communicating unit and sends the distribution condition information to the information center.

7. The mobile object location providing system according to claim 5, wherein the mobile object information storage unit of the information center stores distribution data size information distributed to the mobile object in classification per the mobile object, and the distribution time estimating unit of the information center specifies the kind of distribution data to be determined based on the area information acquisition request, and estimates the distribution time by use of an estimated data size of distribution data corresponding to the distribution data size when the data size is known before distribution, or a kind of the distribution data to be obtained from the distribution data size information and the distribution condition information.

8. The mobile object location providing system according to claim 5, wherein the movement amount estimating unit of the information center extracts the movement vector consisting of the movement speed and the movement direction of the mobile object going back the distribution time from the current location of the mobile object as the movement history, and adds the extracted movement vector to the current location and thereby estimates the future location of the mobile object.

9. The mobile object location providing system according to claim 5, wherein when a running scheduled route of the mobile object is set, the future location estimating unit of the information center extracts the movement speed of the mobile object going back the distribution time from the current location of the mobile object as the movement history, and adds a movement distance to be obtained from the extracted movement speed to the current location on the running scheduled route and thereby estimates the future location of the mobile object.

* * * * *